(12) United States Patent
Sudo et al.

(10) Patent No.: US 10,650,858 B2
(45) Date of Patent: May 12, 2020

(54) SWITCHING CIRCUIT ON POWER SUPPLY FOR MAGNETIC DISK RECORDING DEVICE

(71) Applicants: Kabushiki Kaisha Toshiba, Minato-ku, Tokyo (JP); Toshiba Electronic Devices & Storage Corporation, Minato-ku, Tokyo (JP)

(72) Inventors: Daisuke Sudo, Yokohama Kanagawa (JP); Hiroshi Isokawa, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/114,560

(22) Filed: Aug. 28, 2018

(65) Prior Publication Data

US 2019/0206437 A1    Jul. 4, 2019

(30) Foreign Application Priority Data

Dec. 28, 2017 (JP) ................................ 2017-254051

(51) Int. Cl.
| | | |
|---|---|---|
| G11B 19/20 | (2006.01) | |
| G11B 19/06 | (2006.01) | |
| G11B 19/00 | (2006.01) | |
| G11B 5/54 | (2006.01) | |

(52) U.S. Cl.
CPC .......... *G11B 19/2063* (2013.01); *G11B 19/00* (2013.01); *G11B 19/06* (2013.01); *G11B 5/54* (2013.01); *G11B 19/2072* (2013.01); *G11B 19/2081* (2013.01)

(58) Field of Classification Search
None
See application file for complete search history.

(56) References Cited

U.S. PATENT DOCUMENTS

| | | | | |
|---|---|---|---|---|
| 6,163,425 | A * | 12/2000 | Isokawa ................... | G11B 5/00 360/66 |
| 6,181,502 | B1 * | 1/2001 | Hussein ............... | G11B 21/083 360/69 |
| 6,342,984 | B1 * | 1/2002 | Hussein ............... | G11B 21/083 318/432 |
| 6,396,652 | B1 * | 5/2002 | Kawachi ................. | G11B 5/54 360/73.03 |
| 6,567,232 | B1 | 5/2003 | Klaassen | |

(Continued)

FOREIGN PATENT DOCUMENTS

| | | |
|---|---|---|
| JP | 2006-209827 A | 8/2006 |
| JP | 2008-181602 A | 8/2008 |
| JP | 2014-068530 A | 4/2014 |

*Primary Examiner* — Tan X Dinh
(74) *Attorney, Agent, or Firm* — White & Case LLP

(57) ABSTRACT

According to one embodiment, there is provided a disk device including a head, a disk, a first motor, and a first circuit. The disk has a recording surface. The first motor causes the head to seek along the recording surface. The first circuit can switch between a first state and a second state. The first state is a state where a current path of the first motor is electrically cut off from a first electricity storage unit. The second state is a state where the current path of the first motor is electrically connected to the first electricity storage unit.

7 Claims, 17 Drawing Sheets

(56) References Cited

U.S. PATENT DOCUMENTS

| | | | |
|---|---|---|---|
| 6,594,102 B1* | 7/2003 | Kanda | G11B 5/54 360/75 |
| 6,765,746 B2 | 7/2004 | Kusumoto | |
| 6,865,049 B1 | 3/2005 | Codilian et al. | |
| 9,355,676 B1* | 5/2016 | Nicholls | H02P 3/14 |
| 2002/0141102 A1* | 10/2002 | Kusumoto | G11B 5/54 360/75 |
| 2005/0078404 A1* | 4/2005 | Kuramoto | G11B 5/54 360/75 |
| 2006/0164749 A1 | 7/2006 | Yamamoto | |

* cited by examiner

SWITCHING CIRCUIT ON POWER SUPPLY FOR MAGNETIC DISK RECORDING DEVICE

CROSS-REFERENCE TO RELATED APPLICATIONS

This application is based upon and claims the benefit of priority from Japanese Patent Application No. 2017-254051, filed on Dec. 28, 2017; the entire contents of which are incorporated herein by reference.

FIELD

Embodiments described herein relate generally to a disk device and an information processing apparatus.

BACKGROUND

Disk devices having motors realize predetermined control operation by supplying electric power for driving to the motors. In this case, it is desired that the power usage efficiency of the disk device be improved.

DETAILED DESCRIPTION

In general, according to one embodiment, there is provided a disk device including a head, a disk, a first motor, and a first circuit. The disk has a recording surface. The first motor causes the head to seek along the recording surface. The first circuit can switch between a first state where a current path of the first motor is electrically cut off from a first electricity storage unit and a second state where the current path of the first motor is electrically connected to the first electricity storage unit.

Exemplary embodiments of a disk device will be explained below in detail with reference to the accompanying drawings. The present invention is not limited to the following embodiments.

(Embodiment)

Figure 1:
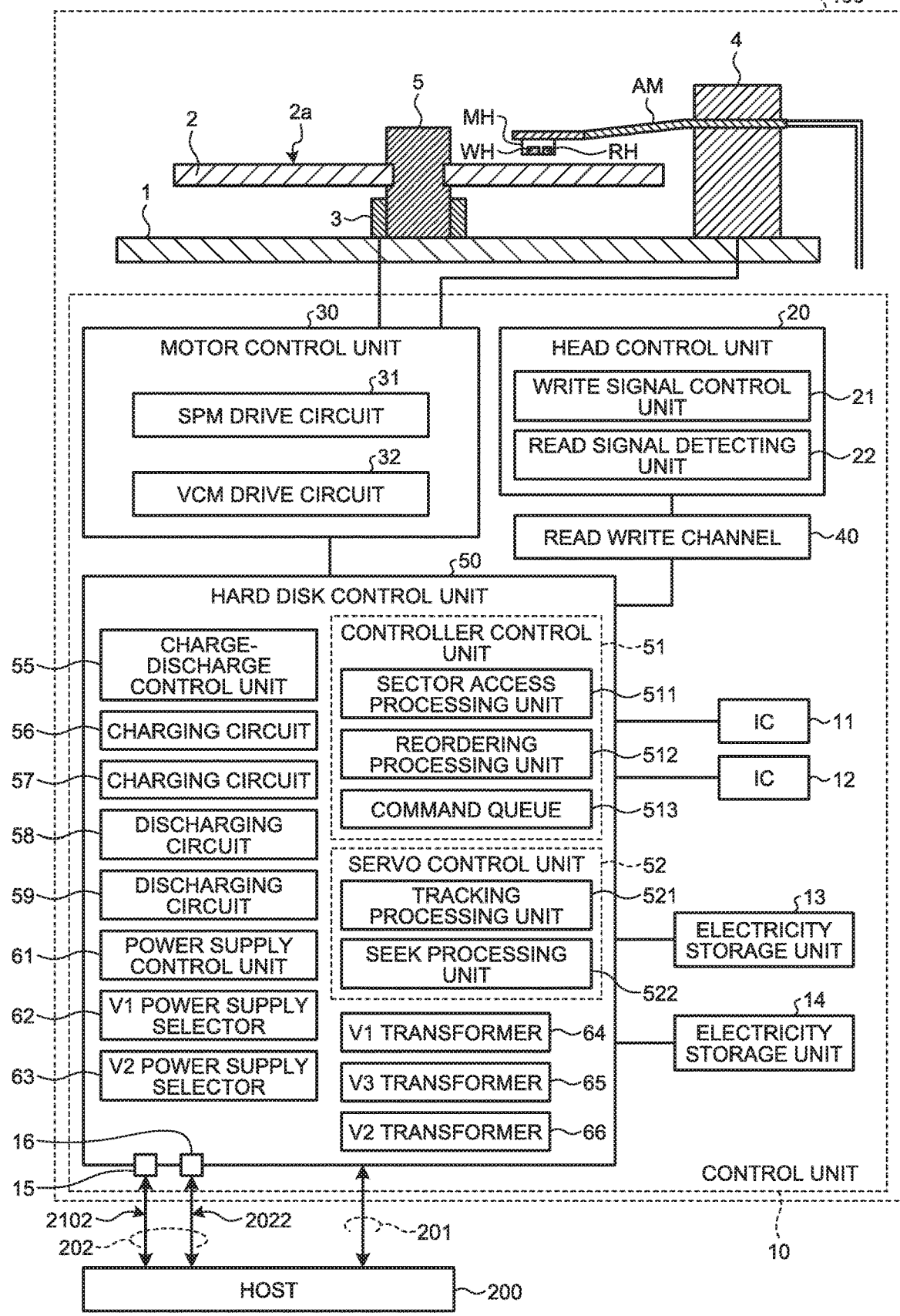
FIG. 1 is a diagram illustrating schematically the configuration of a disk device according to an embodiment.

A disk device according to an embodiment will be described. The disk device includes a plurality of motors and supplies electric power for driving to each of the motors, thereby realizing predetermined control operation. For example, a disk device 100 is configured as shown in FIG. 1. FIG. 1 is a diagram illustrating schematically the configuration of the disk device 100.

The disk device 100 is, for example, a hard disk device, is connected to a host 200 via a communication line 201 to be communicative, and functions as an external storage medium of the host 200. For example, the communication line 201 may be a serial communication line, and the host 200 may be a personal computer, or the communication line 201 may be a wired and/or wireless network, and the host 200 may be a server. The disk device 100 may be configured such that power can be supplied from the host 200 via a power line group 202. The power line group 202 includes a power line 2021 and a power line 2022.

The disk device 100 comprises a chassis 1, a disk 2, a spindle motor (SPM) 3, a spindle 5, a head MH, an actuator arm AM, a voice coil motor (VCM) 4, and a control unit 10. The control unit 10 controls the components and, for example, supplies electric power for driving to each of the SPM (second motor) 3 and VCM (first motor) 4, thereby realizing predetermined control operation. The control unit 10 includes a head control unit 20, a motor control unit 30, a read write channel 40, and a hard disk control unit 50.

The chassis 1 rotatably supports the disk 2 via the spindle 5. The disk 2 is a disk-shaped recording medium (e.g., a magnetic disk) on which a variety of information can be recorded. The disk 2 has multiple tracks concentric with the spindle 5 as the center, or one spiral track. On each track, multiple data areas and servo areas are provided alternately in a circumferential direction. The chassis 1 slidably supports the actuator arm AM via the VCM 4. The actuator arm AM holds the head MH at its tip on the opposite side from the VCM 4.

The head MH is moved to seek as the actuator arm AM slides, so as to perform a write operation of writing data onto the disk 2 and a read operation of reading data from the disk 2. The head MH includes a write head WH by which to perform the write operation and a read head RH by which to perform the read operation. The head MH is held at the tip of the actuator arm AM and moves in a down track direction above the recording surface 2a of the disk 2 with being kept floating slightly above the recording surface 2a of the disk 2 by lift force generated by the rotation of the disk 2.

The head control unit 20 controls write operations and/or read operations by the head MH. The head control unit 20 includes a write signal control unit 21 and a read signal detecting unit 22. The write signal control unit 21 generates a write current according to a write signal received from the hard disk control unit 50 via the read write channel 40 to supply to the write head WH. The read signal detecting unit 22 generates a read signal according to a read current received from the read head RH to supply to the hard disk control unit 50 via the read write channel 40.

The motor control unit 30 controls the supply of power to each motor. The motor control unit 30 includes an SPM drive circuit 31 and a VCM drive circuit 32.

The SPM drive circuit 31 supplies electric power for driving (e.g., drive current) to the SPM 3 to control the rotation of the SPM 3. The SPM 3 rotates the disk 2 with the spindle 5 as the center using electric power for driving received from the SPM drive circuit 31. By this means, the head MH moves in a down track direction above the recording surface 2a of the disk 2.

The VCM drive circuit 32 supplies electric power for driving (e.g., drive voltage) to the VCM 4 to control the drive of the VCM 4. The VCM 4 causes the actuator arm AM to slide in a direction along the recording surface 2a using electric power for driving received from the control unit 10 so as to make the head MH seek along the recording surface 2a. By this means, the VCM 4 makes the head MH move in a cross track direction so as to change tracks on the disk 2 on which to perform a write operation and/or a read operation.

The read write channel 40 performs data transfer between the head control unit 20 and the hard disk control unit 50. The read write channel 40 converts a signal (data, a servo signal, or the like) read by the read head RH to a data format that the host 200 deals with and converts data outputted from the host 200 to a signal format for the write head WH to write.

The hard disk control unit 50 controls each part of the disk device 100 according to firmware and performs interface operations for the host 200. When receiving a write request and data from the host 200 via the communication line 201, the hard disk control unit 50, in response to the write request, controls writing the data onto the disk 2 via the read write channel 40, head control unit 20, and head MH. When receiving a read request from the host 200 via the communication line 201, the hard disk control unit 50, in response to the read request, reads data from the disk 2 via the head MH, head control unit 20, and read write channel 40 and transmits to the host 200 via the communication line 201.

The hard disk control unit 50 includes a controller control unit 51 and a servo control unit 52. The controller control unit 51 includes a sector access processing unit 511, a reordering processing unit 512, and a command queue 513. The servo control unit 52 includes a tracking processing unit 521 and a seek processing unit 522.

Figure 2:
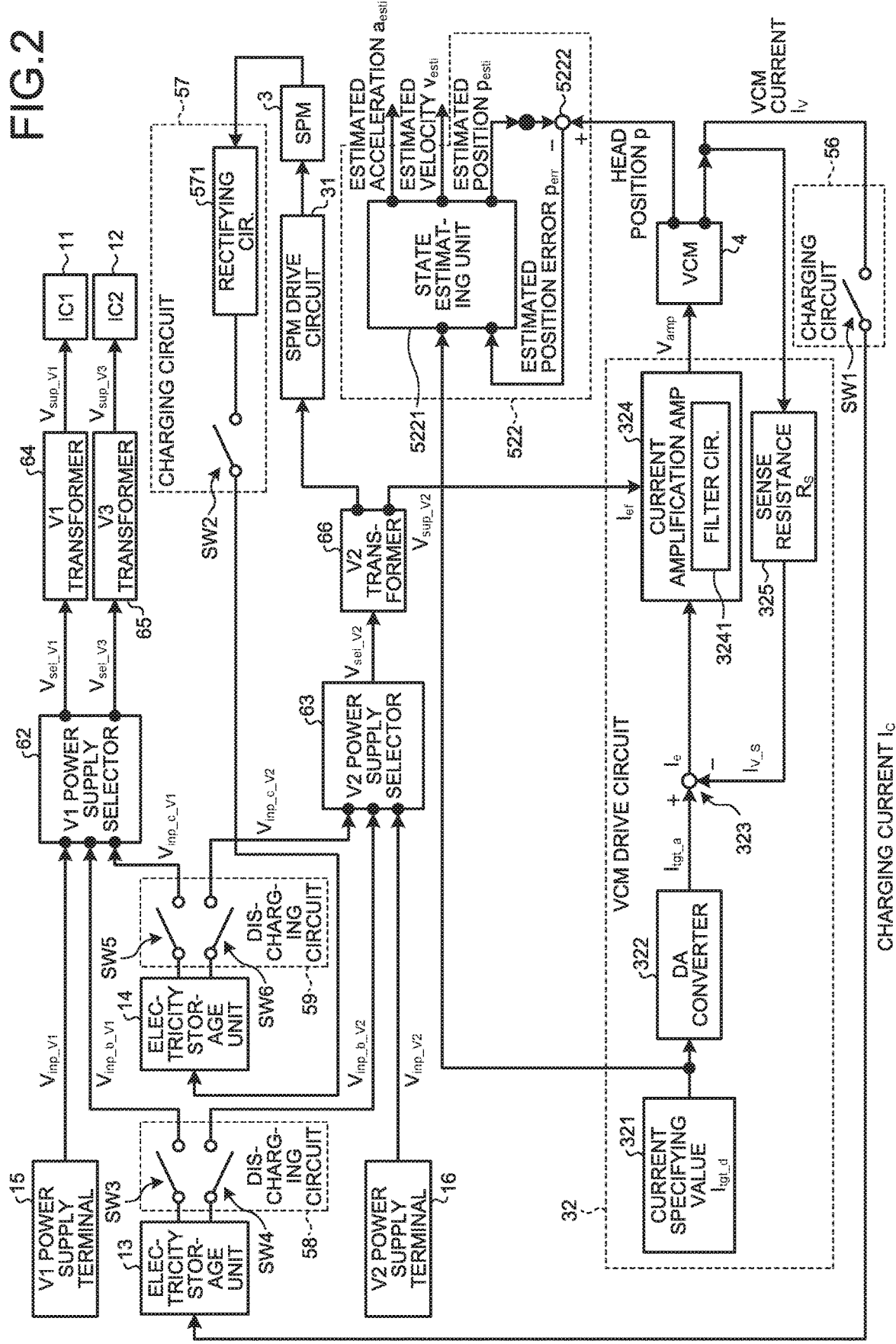
FIG. 2 is a diagram illustrating the circuit configuration of the disk device according to the embodiment.

The seek processing unit 522 includes a state estimating unit 5221 and a subtracter 5222 shown in FIG. 2. FIG. 2 is a diagram illustrating the circuit configuration of the disk device 100. The state estimating unit 5221 receives a current specifying value $I_{tgt\_d}$ from the VCM drive circuit 32 as shown in FIG. 2 and obtains an estimated position $p_{esti}$ and an estimated velocity $v_{esti}$ of the head MH based on the current specifying value $I_{tgt\_d}$ by using an observer. The state estimating unit 5221 takes the difference in the estimated velocity $v_{esti}$ between samples to obtain an estimated acceleration $a_{esti}$. The seek processing unit 522 obtains the current position (head position) p of the head MH based on a servo signal read from servo areas of the disk 2 and takes the difference between the current position p and the estimated position $p_{esti}$ with use of the subtracter 5222 to obtain an estimated position error $p_{err}$. The seek processing unit 522 corrects state estimated values (the estimated position $p_{esti}$, estimated velocity $v_{esti}$, and estimated acceleration $a_{esti}$) of the head MH so that the estimated position error $p_{err}$ comes closer to zero, changes the current specifying value $I_{tgt\_d}$ according to the corrected state estimated values, and supplies the changed current specifying value $I_{tgt\_d}$ as a current specifying value $I_{tgt\_d}$ 321 to the VCM drive circuit 32.

In the VCM drive circuit 32, the current specifying value $I_{tgt\_d}$ 321 (a digital signal) is DA-converted into a current specifying signal $I_{tgt\_a}$ (an analog signal) by a DA converter 322; a VCM current $I_v$ is converted into a VCM signal $I_{v\_s}$ by a sense resistance $R_s$ 325; and the VCM signal $I_{v\_s}$ is subtracted from the current specifying signal $I_{tgt\_a}$ by a subtracter 323 to generate an error signal $I_e$ to be supplied to a current amplification amplifier 324. The current amplification amplifier 324 receives a power supply voltage $V_{sup\_V2}$ from a V2 transformer 66 and, using the power supply voltage $V_{sup\_V2}$, performs filtering on the error signal $I_e$ by a filter circuit 3241 to generate an error signal $I_{ef}$ and to generate a drive voltage $V_{amp}$ according to the error signal $I_{ef}$. The current amplification amplifier 324 can adjust the response time of VCM current control by adjusting coefficients of the filter circuit 3241. The current amplification amplifier 324 supplies the drive voltage $V_{amp}$ to the VCM 4. This causes a VCM current $I_v$ according to the current specifying value $I_{tgt\_d}$ to flow through the VCM 4, so that the VCM 4 causes the actuator arm AM to slide in a direction along the recording surface 2a to make the head MH seek along the recording surface 2a.

At this time, in the VCM 4, although the magnitude of the VCM current $I_v$ may vary, back electro-motive force (BEMF) to prevent the variation of the VCM current $I_v$ may be generated, so that a back electromotive voltage $V_{bemf}$ according to the moving velocity v of the actuator arm AM may be generated. The back electromotive voltage $V_{bemf}$ can be expressed by the following equation 1.

$$V_{bemf} = K_f \times V \qquad \text{Eq. 1}$$

In equation 1, $K_f$ is a current force constant when it is taken as an approximation that the head MH moves in translation in a radial direction of the disk 2. Electrical energy according to this back electromotive voltage $V_{bemf}$ in seek operation, if retained in the VCM 4, may become thermal energy due to the resistance component of its current path, resulting in an increase in the temperature of the VCM 4. It is desired that the disk device 100 effectively utilize this electrical energy to improve the power usage efficiency.

Accordingly, in the present embodiment, by configuring the disk device 100 such that a current path of the VCM 4 can be electrically connected to an electricity storage unit 13, the electricity storage unit 13 can be charged with a current according to the back electromotive voltage $V_{bemf}$ of the VCM 4 in the disk device 100 to improve the power usage efficiency.

That is, in the disk device 100, during a constant speed period in a seek time period when seek operation is performed, the current path of the VCM 4 and the electricity storage unit 13 are connected to be conductive, so that the electricity storage unit 13 is charged with electricity using the back electromotive voltage $V_{bemf}$ of the VCM 4. While charging the electricity storage unit 13 with electricity is repeated several times, the amount of power stored in the electricity storage unit 13 is monitored, and, when the amount of power in the electricity storage unit 13 exceeds a threshold, the SPM 3, VCM 4, ICs 11, 12, and the like are driven using power in the electricity storage unit 13. By this means, electrical energy according to the back electromotive voltage $V_{bemf}$ of the VCM 4 can be effectively utilized, so that the total power consumption in the disk device 100 can be reduced.

Specifically, as shown in FIGS. 1 and 2, the control unit 10 further includes the ICs 11, 12, the electricity storage unit 13, an electricity storage unit 14, a V1 power supply terminal 15, and a V2 power supply terminal 16. The hard disk control unit 50 further includes a charge-discharge control unit 55, a charging circuit (first circuit) 56, a charging circuit (second circuit) 57, a discharging circuit (third circuit) 58, a discharging circuit (fourth circuit) 59, a power supply control unit 61, a V1 power supply selector 62, a V2 power supply selector 63, a V1 transformer 64, a V3 transformer 65, and a V2 transformer 66.

In FIG. 2, the charging circuit 56 can switch between a first state and a second state. The first state is a state where the current path of the VCM 4 is electrically cut off from the electricity storage unit 13. The second state is a state where the current path of the VCM 4 is electrically connected to the electricity storage unit 13. The charging circuit 56 has a switch SW1, one end of the switch SW1 being electrically connected to the current path of the VCM 4, the other end of the switch SW1 being electrically connected to the electricity storage unit 13. According to a control signal received from the charge-discharge control unit 55, the charging circuit 56 turns off the switch SW1 to switch to the first state and turns on the switch SW1 to switch to the second state.

For example, the charging circuit 56 switches from the first state to the second state during a seek time period when the head MH is made to seek. That is, the seek time period contains an acceleration period, a constant speed period, and a deceleration period. The acceleration period is a period when the speed of the head MH is accelerated and is a period when the absolute value of the acceleration of the head MH exceeds a first threshold. The constant speed period is subsequent to the acceleration period, is a period when the speed of the head MH can be controlled to be almost constant, and is a period when the absolute value of the acceleration of the head MH is smaller than the first threshold. The deceleration period is subsequent to the constant speed period, is a period when the speed of the head MH is decelerated and is a period when the absolute value of the acceleration of the head MH exceeds the first threshold. At a first timing corresponding to switching from the acceleration period to the constant speed period, the charging circuit 56 switches from the first state to the second state. Thus, during the constant speed period, the charging circuit 56 can make the VCM current $I_v$ from the VCM 4 as a charging current $I_c$ flow into the electricity storage unit 13 to charge the electricity storage unit 13. At a second timing corresponding to switching from the constant speed period to the deceleration period, the charging circuit 56 switches from the second state to the first state. Thus, the charging circuit 56 can finish charging the electricity storage unit 13 with electricity immediately before switching from the constant speed period to the deceleration period.

Figure 3:
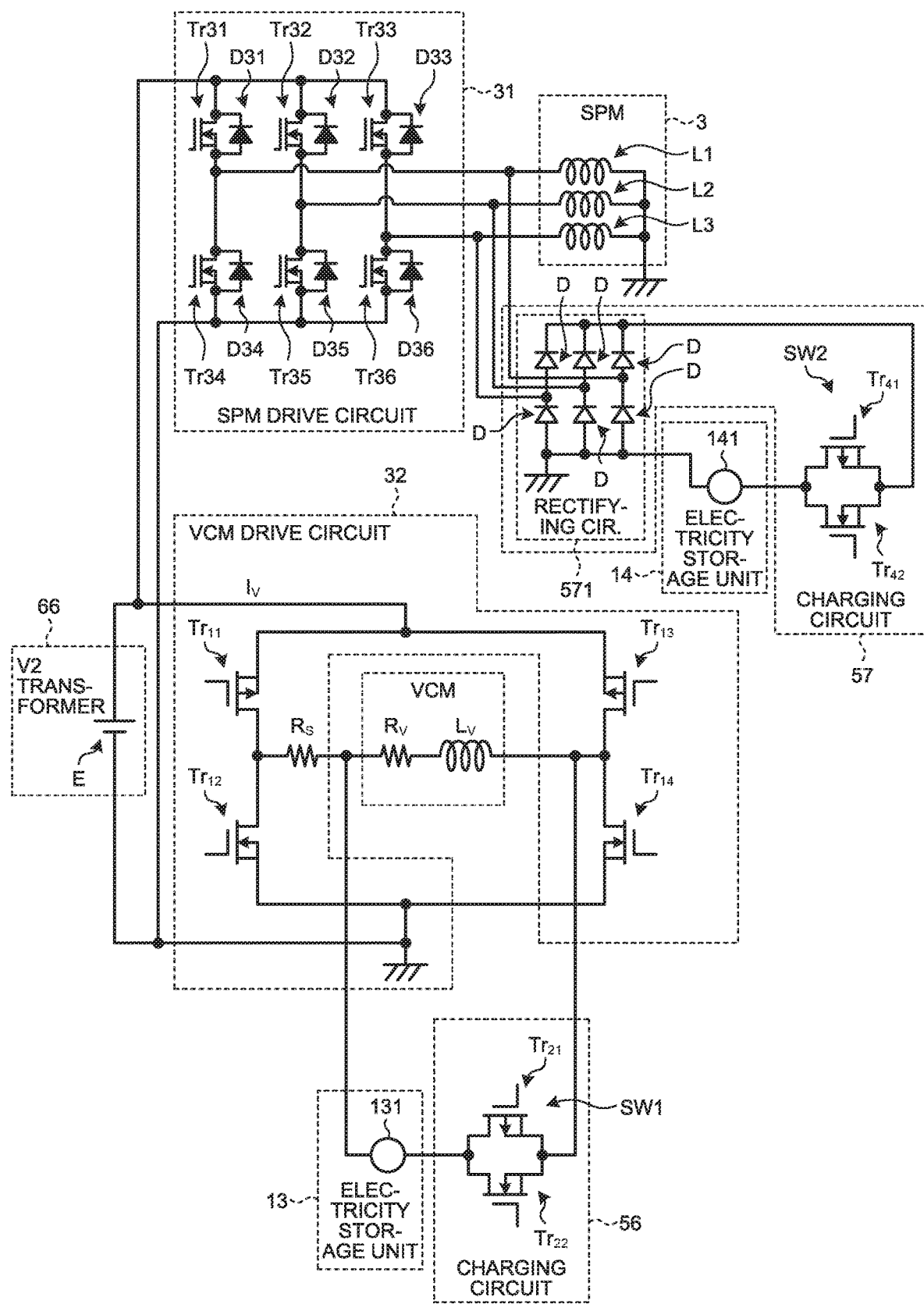
FIG. 3 is a diagram illustrating the configuration of circuitry related to a VCM and SPM in the embodiment.

The charging circuit 56 is configured as shown in, e.g., FIG. 3. FIG. 3 is a diagram illustrating the configuration of circuitry related to the VCM 4 and SPM 3, and related circuitry. The switch SW1 of the charging circuit 56 has a P-channel transistor Tr21 and an N-channel transistor Tr22. The transistors Tr21 and Tr22 form a transfer gate, the sources of the two being connected in common to form one end of the switch SW1, the drains of the two being connected in common to form the other end of the switch SW1. The charge-discharge control unit 55 supplies a control signal of a high (H) level to the gate of the transistor Tr21 and a control signal of a low (L) level to the gate of the transistor Tr22, thereby turning off the switch SW1. The charge-discharge control unit 55 performs at least one of supplying the control signal of the L level to the gate of the transistor Tr21 and supplying the control signal of the H level to the gate of the transistor Tr22, thereby turning on the switch SW1.

When the charging circuit 56 switches to the second state, the electricity storage unit 13 is charged with a current (the VCM current $I_v$) according to the back electromotive voltage $V_{bemf}$ of the VCM 4. The electricity storage unit 13 has a battery 131, and one end of the battery 131 is electrically connected to the charging circuit 56. The other end of the battery 131 may be electrically connected to the current path of the VCM 4 as shown in FIG. 3, or may be connected to ground potential. The battery 131 is configured to be able to store electrical charge and is, for example, an electric double layer capacitor, an electrolytic capacitor, a ceramic capacitor, a secondary battery (e.g., a lithium-ion secondary battery, nickel-hydrogen storage cell), or the like.

The discharging circuit 58 shown in FIG. 2 can switch between a fifth state and a sixth state. The fifth state is a state where the electricity storage unit 13 is electrically cut off from the V1 power supply selector 62 and/or the V2 power supply selector 63. The sixth state is a state where the electricity storage unit 13 is electrically connected to the V1 power supply selector 62 and/or the V2 power supply selector 63. The discharging circuit 58 has switches SW3 and SW4, one end of the switch SW3 being electrically connected to the electricity storage unit 13, the other end of the switch SW3 being electrically connected to the V1 power supply selector 62, one end of the switch SW4 being electrically connected to the electricity storage unit 13, and the other end of the switch SW4 being electrically connected to the V2 power supply selector 63. According to a control signal received from the charge-discharge control unit 55, the discharging circuit 58 turns off the switch SW3 and/or switch SW4 to switch to the fifth state and turns on the switch SW3 and/or switch SW4 to switch to the sixth state.

For example, when power stored in the electricity storage unit 13 comes greater than or equal to a second threshold, the discharging circuit 58 switches from the fifth state to the sixth state. The second threshold can be determined, for example, considering at least one of power necessary for driving the ICs 11, 12, power necessary for driving the VCM 4 (seek operation), and power necessary for driving the SPM 3 (rotational operation).

The V2 transformer 66 shown in FIG. 3 can be regarded equivalently as a voltage source E supplying the power supply voltage $V_{sup\_V2}$, and the VCM drive circuit 32 can be equivalently formed of an H bridge circuit. The VCM drive circuit 32 has P-channel transistors Tr11, Tr13 and N-channel transistors Tr12, Tr14. The transistors Tr11, Tr13 have their sources connected in common to the higher voltage side of the voltage source E, and the transistors Tr12, Tr14 have their sources connected in common to the lower voltage side of the voltage source E. The transistors Tr11, Tr12 have their drains connected in common to one end of the current path of the VCM 4, and the transistors Tr13, Tr14 have their drains connected in common to the other end of the current path of the VCM 4. A resistance $R_v$ and an inductor Lv are connected in series between the one end and the other end of the current path of the VCM 4.

For example, during the seek time period, the charge-discharge control unit 55 controls the charging circuit 55 not to perform charging in the acceleration period and the deceleration period but to perform charging in the constant speed period so as to charge the electricity storage unit 13. Variation in acceleration caused by switching during the constant speed period in the seek time period is small, so that the influence on VCM vibration excitation is small. While electricity remains stored, VCM control and driving ICs are executed by the electricity storage unit 13 discharging.

The charge-discharge control unit 55 can control a charge-discharge mode, thereby controlling whether the charging circuit 56 charges and whether the discharging circuit 58 discharges. When the charge-discharge mode is a charge-discharge off mode, because the current conduction of the transistors Tr21, Tr22 are set to be off, normal VCM application is executed. That is, when the seek direction is forward (from the outer circumference to the inner circumference of the disk 2), the transistors are controlled as shown in Table 1, and when the seek direction is reverse (from the inner circumference to the outer circumference of the disk 2), the transistors are controlled as shown in Table 2.

TABLE 1

SEEK DIRECTION: Forward
(FROM OUTER CIRCUMFERENCE TO INNER CIRCUMFERENCE)

|  | ACCELERATION | CONSTANT SPEED | DECEL-ERATION | CONSTANT SPEED CHARGING |
|---|---|---|---|---|
| $Tr_{11}$ | Off | Off | On | Off |
| $Tr_{12}$ | On | On | Off | Off |
| $Tr_{13}$ | On | On | Off | Off |
| $Tr_{14}$ | Off | Off | On | Off |
| $Tr_{21}$ | Off | Off | Off | On |
| $Tr_{22}$ | Off | Off | Off | Off |

TABLE 2

SEEK DIRECTION: Reverse
(FROM INNER CIRCUMFERENCE TO OUTER CIRCUMFERENCE)

|  | ACCELERATION | CONSTANT SPEED | DECEL-ERATION | CONSTANT SPEED CHARGING |
|---|---|---|---|---|
| $Tr_{11}$ | On | On | Off | Off |
| $Tr_{12}$ | Off | Off | On | Off |
| $Tr_{13}$ | Off | Off | On | Off |
| $Tr_{14}$ | On | On | Off | Off |
| $Tr_{21}$ | Off | Off | Off | Off |
| $Tr_{22}$ | Off | Off | Off | On |

When the charge-discharge mode is a charge mode, all the transistors Tr11, Tr12, Tr13, Tr14 of the H bridge circuit are turned off in current conduction, and simultaneously the voltage source E is set to 0 V. The polarity of the back electromotive voltage is determined according to whether a seek is done toward the disk inner circumference (forward seek) or a seek is done toward the disk outer circumference (reverse seek). As shown in Tables 1 and 2, either the transistor Tr21 or Tr22 is turned on with the other being turned off according to the polarity of the back electromotive voltage, so that electricity can be passed through the electricity storage unit 13 (the battery 131). The electricity storage unit 13 may be able to determine the polarity internally and charge.

When the SPM 3 shown in FIG. 2 is an alternating-current motor, the charging circuit 57 has a switch SW2 and a rectifying circuit 571. The rectifying circuit 571 is connected to the current path of the SPM 3 and rectifies an alternating current according to the back electromotive voltage of the SPM 3. The charging circuit 57 can switch between a third state and a fourth state. The third state is a state where the rectifying circuit 571 is electrically cut off from the electricity storage unit 14. The fourth state is a state where the rectifying circuit 571 is electrically connected to the electricity storage unit 14. In the charging circuit 57, one end of the switch SW2 is electrically connected to the rectifying circuit 571, and the other end of the switch SW2 is electrically connected to the electricity storage unit 14. According to a control signal received from the charge-discharge control unit 55, the charging circuit 57 turns off the switch SW2 to switch to the third state and turns on the switch SW2 to switch to the fourth state.

For example, the charging circuit 57 switches from the third state to the fourth state in an idling period or a power loss protection (PLP) period. The idling period is a period when a sector access processing unit 511 is not currently executing a command and when also no command is queued in the command queue 513. The PLP period is a period when a power supply disconnection has been detected in the disk device 100 (e.g., the supply of power from the host 200 via the power line group 202 and the V1 power supply terminal 15 and/or V2 power supply terminal 16 has been cut off) and when data temporarily stored in a volatile memory (e.g., IC 11 shown in FIG. 1) is to be written into the disk 2 and/or a nonvolatile memory (e.g., IC 12 shown in FIG. 1) to be saved.

The charging circuit 57 is configured as shown in, e.g., FIG. 3. The switch SW2 of the charging circuit 57 has a P-channel transistor Tr41 and an N-channel transistors Tr42. The transistors Tr41 and Tr42 form a transfer gate, the sources of the two being connected in common to form one end of the switch SW2, the drains of the two being connected in common to form the other end of the switch SW2. The charge-discharge control unit 55 supplies a control signal of the H level to the gate of the transistor Tr41 and a control signal of the L level to the gate of the transistor Tr42, thereby turning off the switch SW2. The charge-discharge control unit 55 performs at least one of supplying the control signal of the L level to the gate of the transistor Tr41 and supplying the control signal of the H level to the gate of the transistor Tr42, thereby turning on the switch SW2.

When the charging circuit 57 switches to the fourth state, the electricity storage unit 14 is charged with a current according to the back electromotive voltage of the SPM 3 and rectified by the rectifying circuit 571. The electricity storage unit 14 has a battery 141, and one end of the battery 141 is electrically connected to the charging circuit 57. The other end of the battery 141 may be electrically connected to the reference potential side of the rectifying circuit 571 as shown in FIG. 3, or may be connected to ground potential. The battery 141 is configured to be able to store electrical charge and is, for example, an electric double layer capacitor, an electrolytic capacitor, a ceramic capacitor, a secondary battery (e.g., a lithium-ion secondary battery, nickel-hydrogen storage cell), or the like.

The discharging circuit 59 can switch between a seventh state and an eighth state. The seventh state is a state where the electricity storage unit 14 is electrically cut off from the V1 power supply selector 52 and/or the V2 power supply selector 53. The eighth state is a state where the electricity storage unit 14 is electrically connected to the V1 power supply selector 62 and/or the V2 power supply selector 53. The discharging circuit 59 has switches SW5 and SW6, one end of the switch SW5 being electrically connected to the electricity storage unit 14, the other end of the switch SW5 being electrically connected to the V1 power supply selector 62, one end of the switch SW6 being electrically connected to the electricity storage unit 14, and the other end of the switch SW6 being electrically connected to the V2 power supply selector 63. According to a control signal received from the charge-discharge control unit 55, the discharging circuit 59 turns off the switch SW5 and/or switch SW6 to switch to the seventh state and turns on the switch SW5 and/or switch SW6 to switch to the eighth state.

For example, the discharging circuit 59 switches from the seventh state to the eighth state during the PLP period.

It should be noted that the SPM drive circuit 31 can be equivalently formed of an inverter circuit (circuit reversely converting direct-current power into alternating-current power). The SPM drive circuit 31 has N-channel transistors Tr31 to Tr36 and freewheel diodes D31 to D36. The transistors Tr31 to Tr33 have their drains connected in common to the higher voltage side of the voltage source E, and the transistors Tr34 to Tr35 have their sources connected in common to the lower voltage side of the voltage source E. The SPM drive circuit 31 reversely converts, for example, direct-current power into three-phase alternating-current power. The SPM 3 has inductors L1 to L3 corresponding to the three phases. The source of the transistor Tr31 and the drain of the transistor Tr34 are connected in common to one end of the inductor L1; the source of the transistor Tr32 and the drain of the transistor Tr35 are connected in common to one end of the inductor L2; and the source of the transistor Tr33 and the drain of the transistor Tr36 are connected in common to one end of the inductor L3. In the current path of the SPM 3, the other ends of the inductors L1 to L3 are connected to ground potential. In the rectifying circuit 571, three serial connections of two diodes D corresponding to the three phases are connected in parallel between the reference-side line and a higher-voltage-side line, and each of the inductors L1 to L3 corresponding to the three phases is electrically connected to the node between the two diodes D of one of the serial connections.

A voltage (e.g., 5 V) to be a power supply voltage V1 can be steadily supplied from the host 200 via the power line 2102 to the V1 power supply terminal 15 shown in FIG. 1. The V1 power supply selector 62 shown in FIG. 2, according to a control signal received from the power supply control unit 61, selects a voltage to be adopted as the power supply voltage V1 from among a voltage $V_{inp\_V1}$ received via the V1 power supply terminal 15, a voltage $V_{inp\_b\_V1}$ supplied from the electricity storage unit 13 via the discharging circuit 58, and a voltage $V_{inp\_c\_V1}$ supplied from the electricity storage unit 14 via the discharging circuit 59. The V1 power supply selector 62 supplies the selected voltage $V_{sel\_V1}$, $V_{sel\_V3}$ to the V1 transformer 64 and V3 transformer 65 respectively. The V1 transformer 64 transforms the voltage $V_{sel\_V1}$ into an internal power supply voltage $V_{sup\_V1}$ for V1 (e.g., 5 V) operation to supply to the IC 11. The V3 transformer 65 transforms the voltage $V_{sel\_V3}$ into an internal power supply voltage $V_{sup\_V3}$ for V3 (e.g., 3 V) operation to supply to the IC 12. The V1 transformer 64 and the V3 transformer 65 can transform into the internal power supply voltages $V_{sup\_V1}$ and $V_{sup\_V3}$ as constant voltages, using a regulator, a charge pump, or the like.

A voltage (e.g., 12 V) to be a power supply voltage V2 can be steadily supplied from the host 200 via the power line 2022 to the V2 power supply terminal 16 shown in FIG. 1. The V2 power supply selector 63 shown in FIG. 2, according to a control signal received from the power supply control unit 61, selects a voltage to be adopted as the power supply voltage V2 from among a voltage $V_{inp\_V2}$ received via the V2 power supply terminal 16, a voltage $V_{inp\_b\_V2}$ supplied from the electricity storage unit 13 via the discharging circuit 58, and a voltage $V_{inp\_c\_V2}$ supplied from the electricity storage unit 14 via the discharging circuit 59. The V2 power supply selector 63 supplies the selected voltage $V_{sel\_V2}$ to the V2 transformer 66. The V2 transformer 66 transforms the voltage $V_{sel\_V2}$ into an internal power supply voltage $V_{sup\_V2}$ for V2 (e.g., 12 V) operation to supply to the SPM drive circuit 31 and the VCM drive circuit 32. The V2 transformer 66 can transform into the internal power supply voltage $V_{sup\_V2}$ as a constant voltage, using a regulator, a charge pump, or the like.

Figure 4:
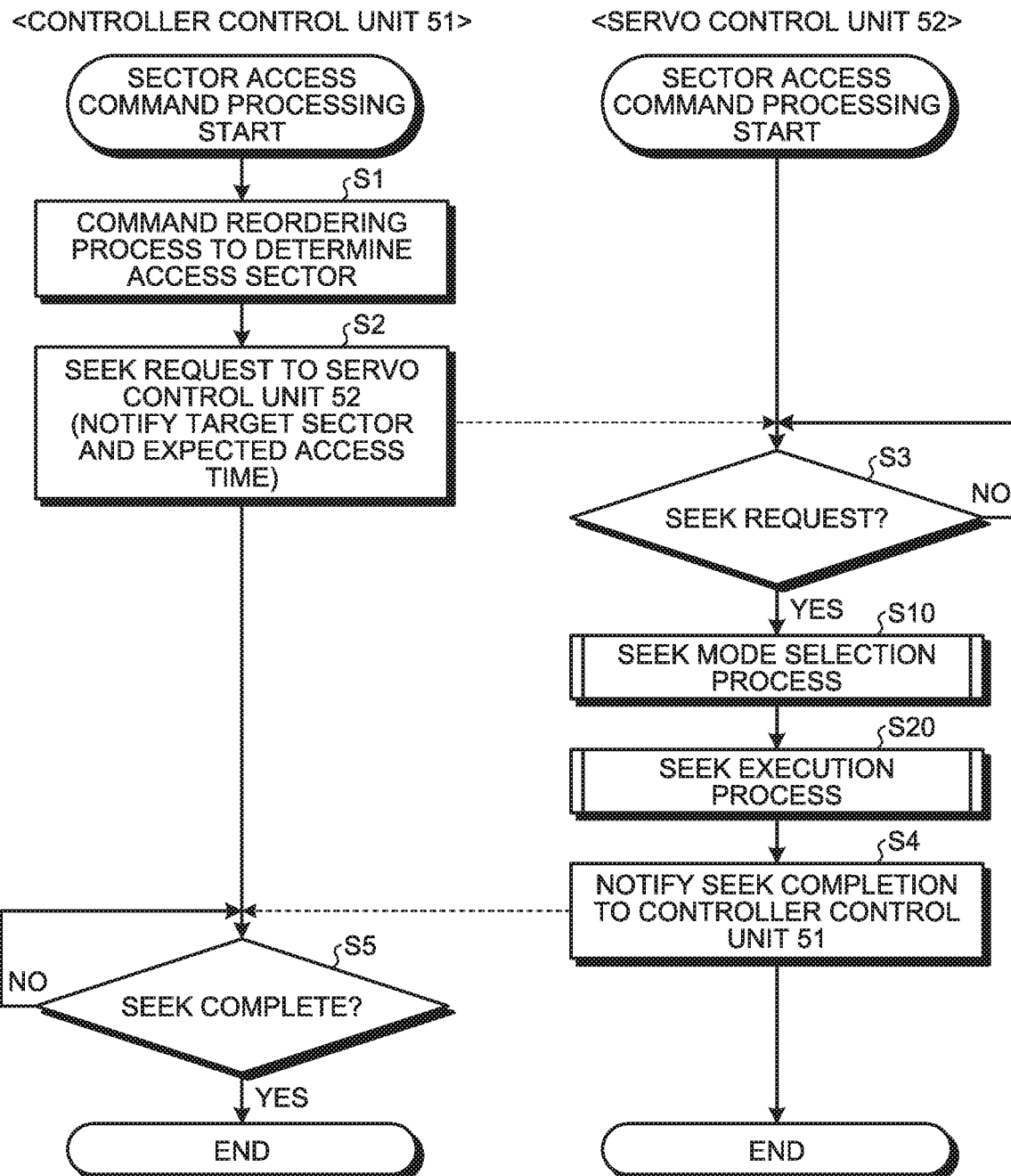
FIG. 4 is a flow chart illustrating in outline the operation of the disk device according to the embodiment.

Next, sector access command processing in the disk device 100 will be described using FIG. 4. FIG. 4 is a flow chart illustrating in outline the operation of the disk device 100 in the sector access command processing.

When receiving a sector access request (e.g., a write request, read request, or the like) from the host 200, the disk device 100 has the controller control unit 51 execute a command reordering process to determine the access destination (access sector) (S1). For example, the controller control unit 51 generates a command according to the sector access request (e.g., a write command according to a write request, a read command according to a read request, or the like) to enqueue into the command queue 513. The reordering processing unit 512 selects the command whose access time is the shortest from among multiple commands queued in the command queue 513 in the command reordering process to start executing it. The controller control unit 51 determines the access destination (access sector according to the address specified by the command) according to the selected command and generates a seek request according to the access destination to notify to the servo control unit 52 (S2). At this time, the controller control unit 51 notifies the target sector and an expected access time contained in the seek request to the servo control unit 52.

The servo control unit 52 waits until receiving the seek request (containing the target sector and an expected access time) from the controller control unit 51 (No at S3) and, when receiving the seek request (Yes at S3), performs a seek mode selection process (S10).

Figure 5:
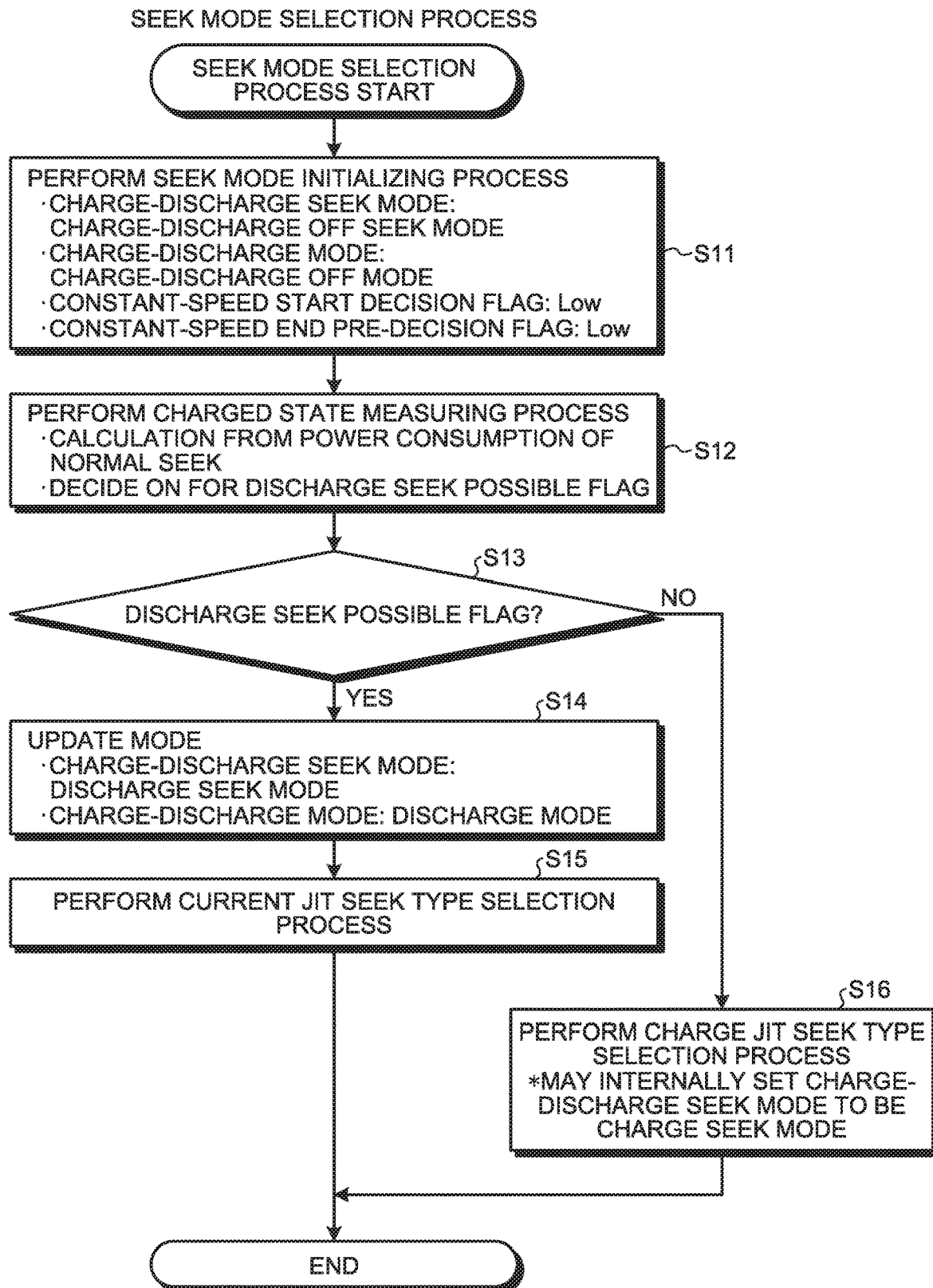
FIG. 5 is a flow chart illustrating a seek mode selection process in the embodiment.

In the seek mode selection process (S10), processing shown in, e.g., FIG. 5 is performed. FIG. 5 is a flow chart illustrating the seek mode selection process.

Figure 6:
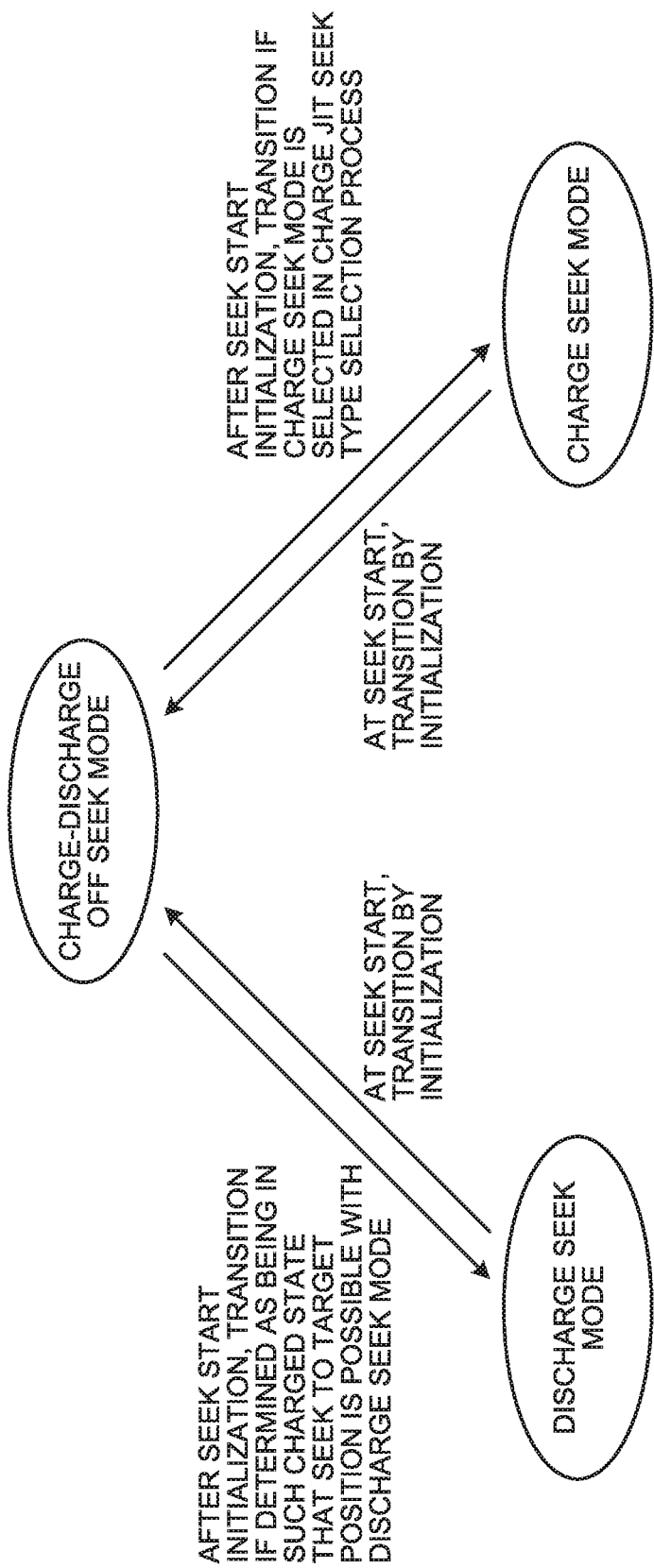
FIG. 6 is a state transition diagram illustrating the transition of a charge-discharge seek mode in the embodiment.
Figure 7:
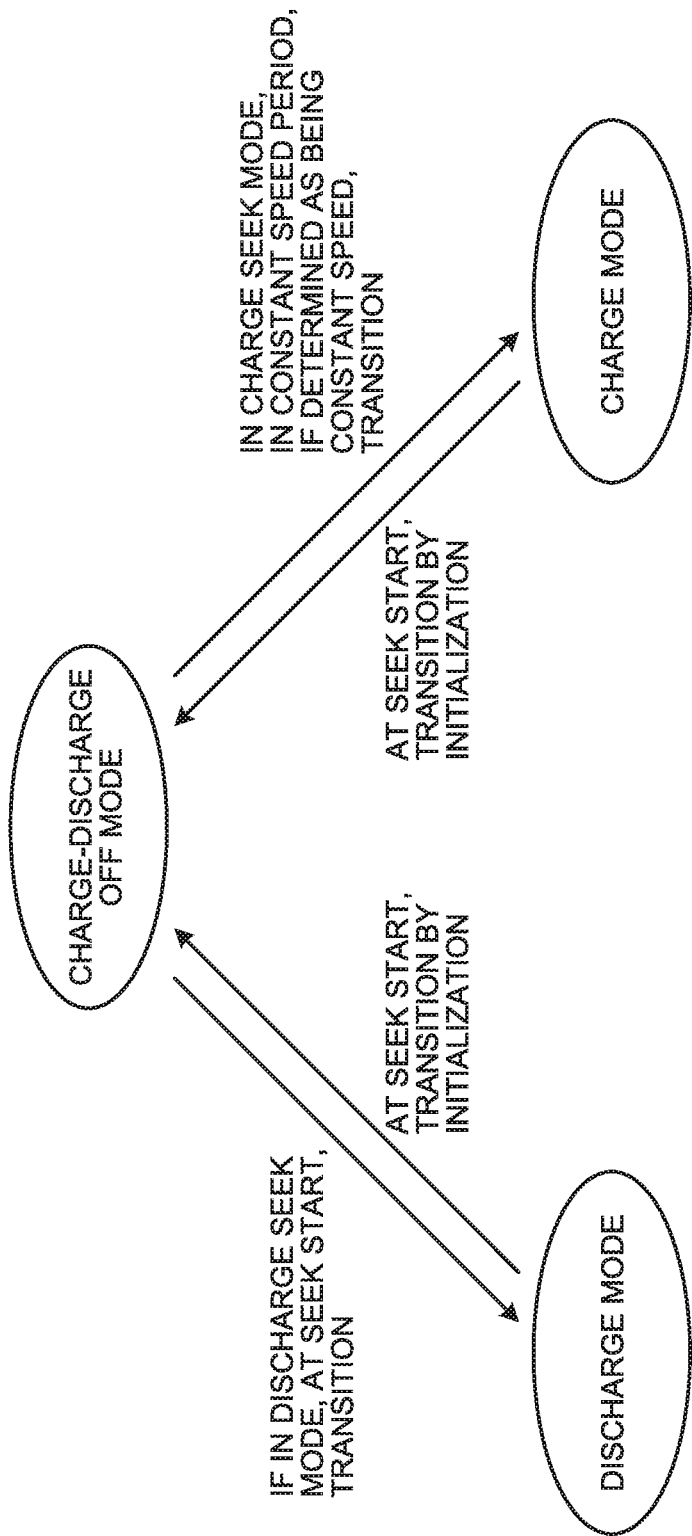
FIG. 7 is a state transition diagram illustrating the transition of a charge-discharge mode in the embodiment.

At a seek start, the servo control unit 52 performs as a seek mode initializing process the initialization of a charge-discharge seek mode, initialization of a charge-discharge mode, initialization of a constant-speed start decision flag, and initialization of a constant-speed end pre-decision flag (S11). The charge-discharge seek mode is set to be a mode on a per seek operation basis as shown in FIG. 6. FIG. 6 is a state transition diagram illustrating the transition of the charge-discharge seek mode. The charge-discharge seek mode is initially set to be a charge-discharge off seek mode. The charge-discharge mode is set to be a mode on a per control sample basis (e.g., per sample of servo control) as shown in FIG. 7. FIG. 7 is a state transition diagram illustrating the transition of the charge-discharge mode. The charge-discharge mode is initially set to be a charge-discharge off mode. The constant-speed start decision flag is a flag which is to be set in order to cause the decision to start constant-speed control and is initially set to be low. The constant-speed end pre-decision flag is a flag which is to be set in order to cause the decision before the finish timing to end constant-speed control and is initially set to be low. That is, in the seek mode initializing process, the servo control unit 52 sets the charge-discharge seek mode to the charge-discharge off seek mode, the charge-discharge mode to the charge-discharge off mode, the constant-speed start decision flag to be low, and the constant-speed end pre-decision flag to be low.

Referring back to FIG. 5, the servo control unit 52 performs a charged state measuring process (S12). If a discharge seek is possible with power currently stored in the electricity storage unit 13 on the basis of the calculation from the power consumption of a normal seek, a discharge seek possible flag is set.

If the discharge seek possible flag is set (Yes at S13), the servo control unit 52 makes the charge-discharge seek mode and the charge-discharge mode transition to update as shown in FIGS. 6 and 7 (S14). That is, the servo control unit 52 sets the charge-discharge seek mode to be the discharge seek mode and the charge-discharge mode to be the discharge mode.

Referring back to FIG. 5, the servo control unit 52 selects a current JIT seek type in a current JIT seek type selection process (S15). The JIT seek is a seek to reach a target sector exactly and is generally low in current level. Or it selects a seek profile containing a constant speed period. As a result, the effect of reducing the power consumption and vibration is produced.

If the discharge seek possible flag is not set (No at S13), the servo control unit 52 performs a charge JIT seek type selection process (S16). In this, a seek profile that is a combination of charging and JIT is determined. For example, if a charge seek in a rotation wait time is possible, the charge-discharge seek mode is made to transition from the charge-discharge off seek mode to the charge seek mode as shown in FIG. 6. If the rotation wait time has an enough margin, a JIT seek may be performed to make the seek further slow. Or, with some seek distances, if the use of an existing JIT seek without charging is advantageous in terms of power consumption, the charge-discharge seek mode may be kept being the charge-discharge off seek mode, without switching to the charge seek mode.

Referring back to FIG. 4, the servo control unit 52 selects a seek mode in the seek mode selection process (S10) and then performs a seek execution process (S20).

Figure 8:
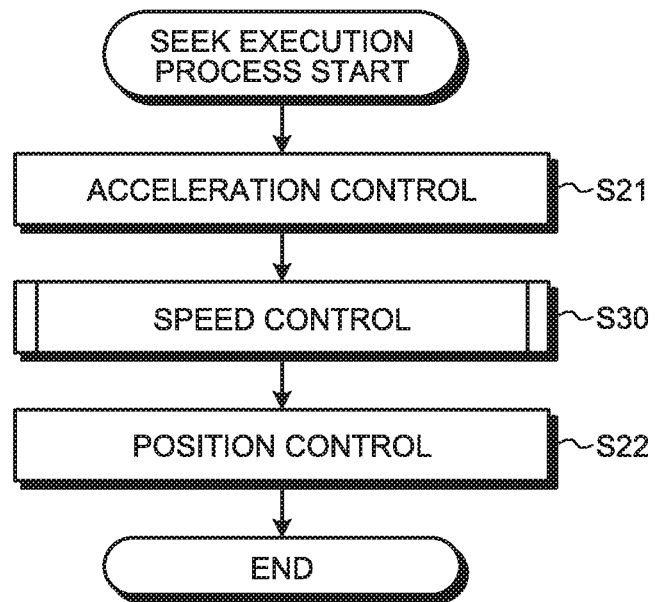
FIG. 8 is a flow chart illustrating a seek execution process in the embodiment.

In the seek execution process (S20), the servo control unit 52 performs the seek execution process as shown in FIG. 8. FIG. 8 is a flow chart illustrating the seek execution process. The servo control unit 52 performs acceleration control (S21) and performs speed control during at least the deceleration period in the seek time period (S30).

Figure 9:
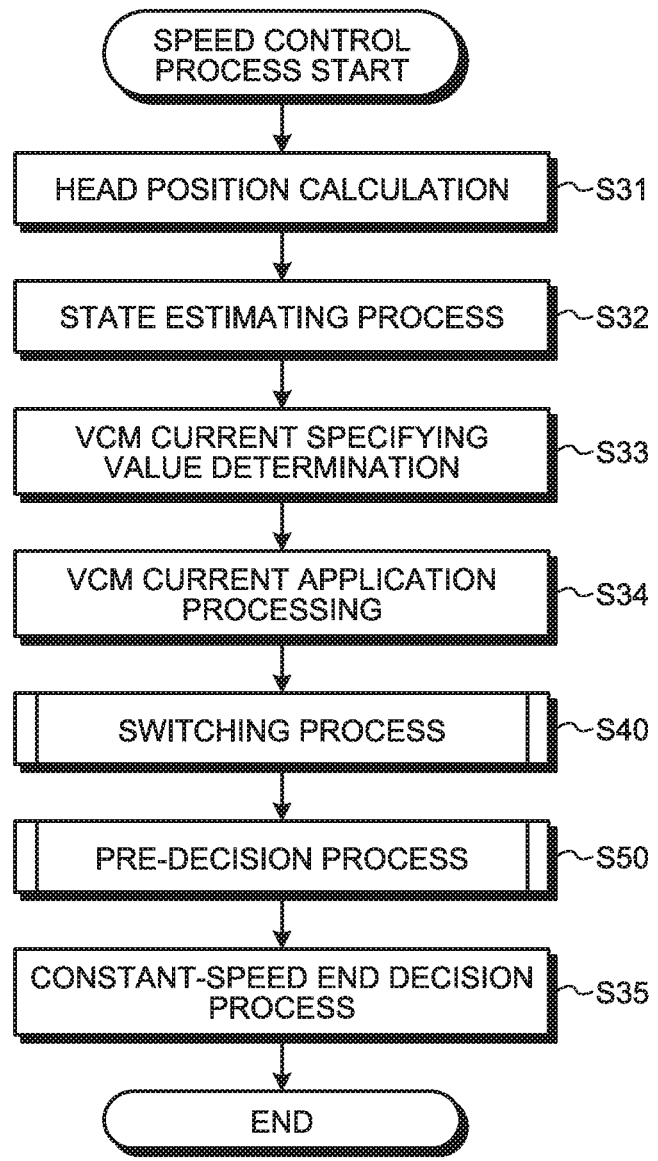
FIG. 9 is a flow chart illustrating a speed control process in the embodiment.

In the speed control (S30), the servo control unit 52 performs the speed control process as shown in FIG. 9. FIG. 9 is a flow chart illustrating the speed control process. The servo control unit 52 calculates the position of the head MH using the servo signal read from servo areas of the disk 2 (S31) and performs a state estimating process to estimate the state (an estimated position $p_{esti}$, an estimated velocity $v_{esti}$, and an estimated acceleration $a_{esti}$) of the head MH using a state observer (S32). The servo control unit 52 takes the difference between the current position p calculated at S31 and the estimated Position $p_{esti}$ estimated at S32 to obtain an estimated position error $p_{err}$ and corrects state estimated values (the estimated position $p_{esti}$, estimated velocity $v_{esti}$, and estimated acceleration $a_{esti}$) of the head MH so that the estimated position error $p_{err}$ comes closer to zero and determines the current specifying value $I_{tgt\_d}$ according to the corrected state estimated values (S33). The servo control unit 52 supplies the current specifying value $I_{tgt\_d}$ determined at S33 as a current specifying value $I_{tgt\_d}$ 321 to the VCM drive circuit 32. Thus, VCM current application processing is performed which causes the VCM current $I_v$ according to the current specifying value $I_{tgt\_d}$ to flow through the VCM 4 (S34). Then the servo control unit 52 performs a switching process (S40).

Figure 10:
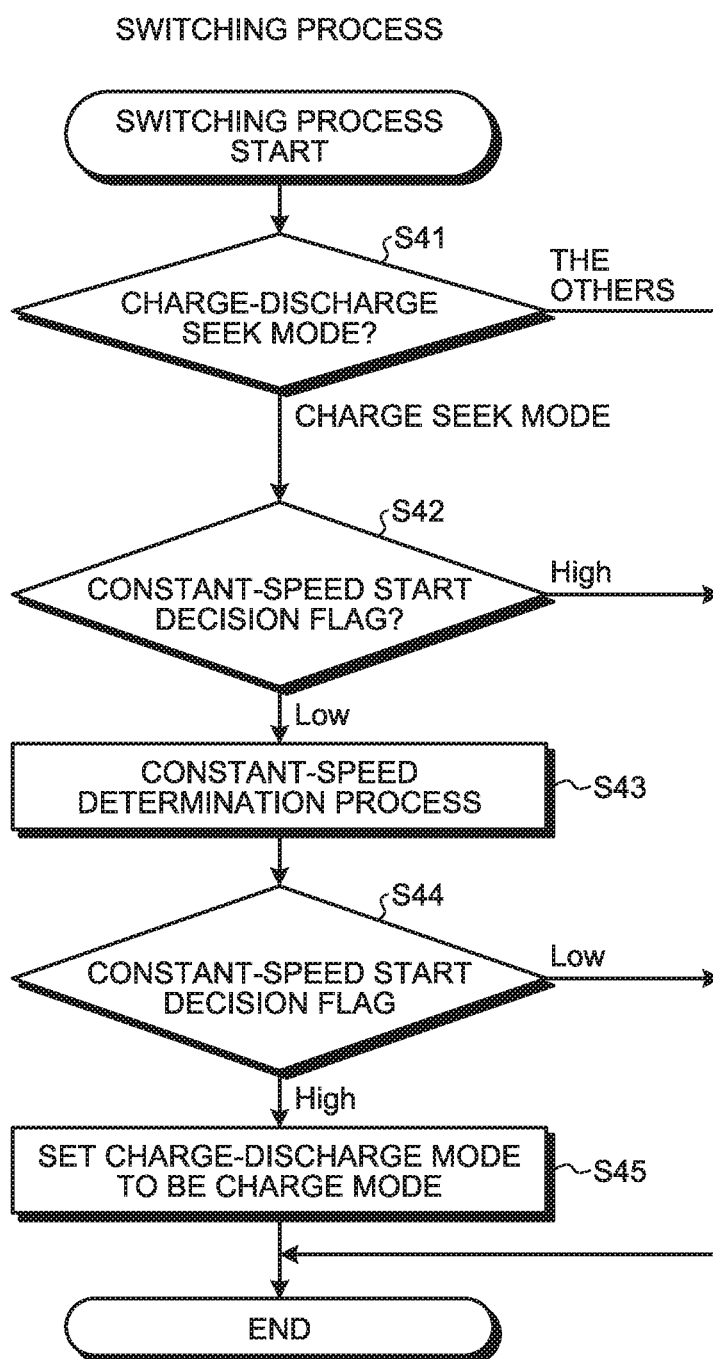
FIG. 10 is a flow chart illustrating a switching process in the embodiment.

In the switching process (S40), the servo control unit 52 performs the switching process as shown in FIG. 10. FIG. 10 is a flow chart illustrating the switching process. The servo control unit 52 ascertains the charge-discharge seek mode and, if the charge-discharge seek mode is not the charge seek mode ("the others" at S41), ends the process. If the charge-discharge seek mode is the charge seek mode ("charge seek mode" at S41), the servo control unit 52 ascertains the constant-speed start decision flag and, if the constant-speed start decision flag is high (High at S42), ends the process because the speed is determined to be constant in a constant-speed determination process, so that thereafter the constant-speed determination process need not be performed. If the constant-speed start decision flag is low (Low at S42), the servo control unit 52 performs the constant-speed determination process to decide on a timing in a constant speed period at which to start charging (S43). For example, if the absolute value of the acceleration of the head MH exceeds the first threshold, the servo control unit 52 can allow the constant-speed start decision flag to remain low and, if the absolute value of the acceleration of the head MH is less than or equal to the first threshold, can change the constant-speed start decision flag from low to high.

The servo control unit 52 ascertains the constant-speed start decision flag and, if the constant-speed start decision flag remains low (Low at S44), ends the process on the basis that charging need not be performed. If the constant-speed start decision flag is high (High at S44), the servo control unit 52 makes the charge-discharge mode transition from the charge-discharge off mode to the charge mode to set on the basis that charging can be started because the speed is constant (S45).

Referring back to FIG. 9, after performing the switching process (S40), the servo control unit 52 performs a pre-decision process (S50).

Figure 11:
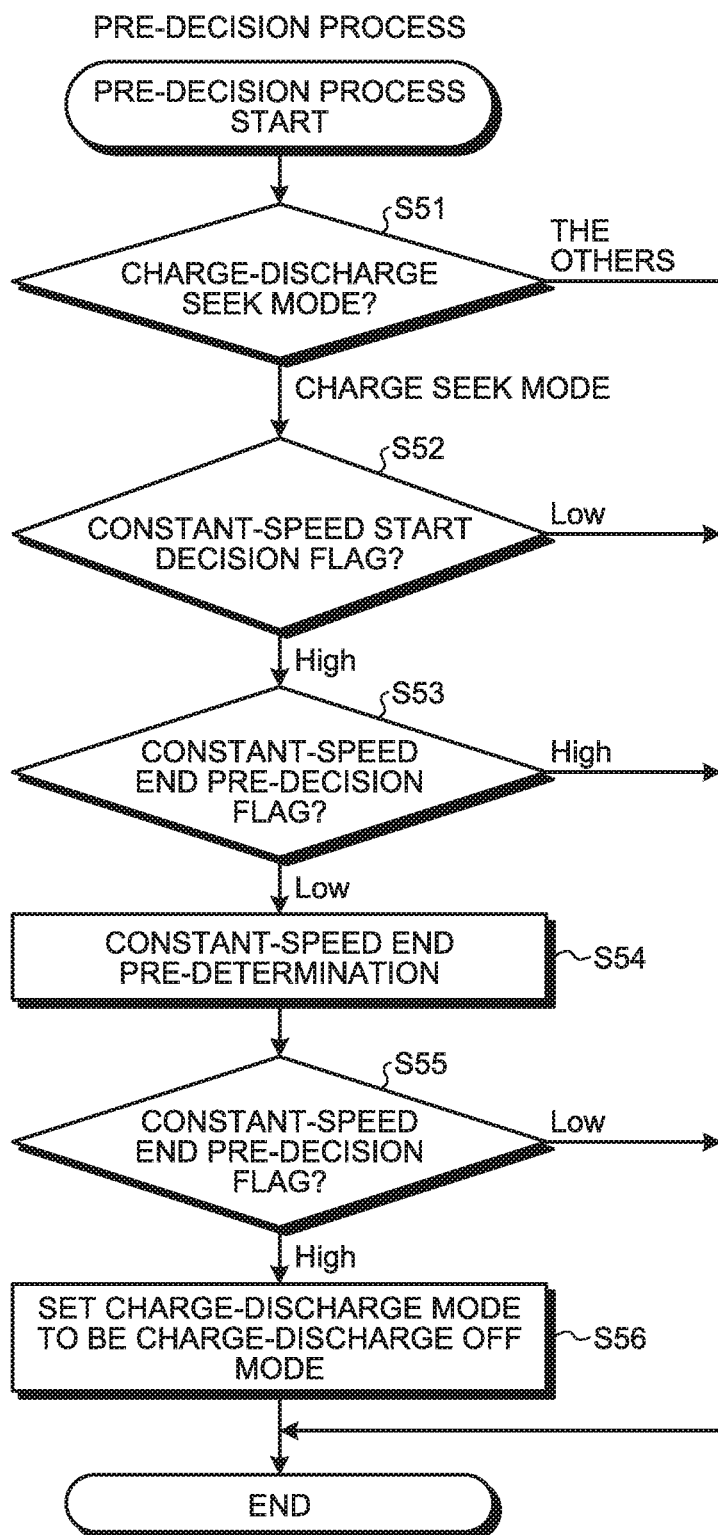
FIG. 11 is a flow chart illustrating a pre-decision process in the embodiment.

In the pre-decision process (S50), the servo control unit 52 performs the pre-decision process as shown in FIG. 11. FIG. 11 is a flow chart illustrating the pre-decision process. The servo control unit 52 ascertains the charge-discharge seek mode and, if the charge-discharge seek mode is not the charge seek mode ("the others" at S51), ends the process. If the charge-discharge seek mode is the charge seek mode ("charge seek mode" at S51), the servo control unit 52 ascertains the constant-speed start decision flag and, if the constant-speed start decision flag is low (Low at S52), ends the process on the basis that charging is not being performed. If the constant-speed start decision flag is high (High at S52), the servo control unit 52 ascertains the constant-speed end pre-decision flag and, if the constant-speed end pre-decision flag is high (High at S53), ends the process because the process later than the constant-speed end pre-decision is unnecessary. If the constant-speed end pre-decision flag is low (Low at S53), the servo control unit 52 performs the constant-speed end pre-determination (S54). That is, the servo control unit 52 obtains the difference between the current position p of the head MH and the target position $p_{tgt}$ as a remaining distance $d_r$ and allows the constant-speed end pre-decision flag to remain low until the absolute value of the remaining distance $d_r$ becomes less than a threshold and, when the absolute value of the remaining distance $d_r$ becomes less than the threshold, can change the constant-speed end pre-decision flag from low to high.

The servo control unit 52 ascertains the constant-speed end pre-decision flag and, if the constant-speed end pre-decision flag is low (Low at S55), ends the process and, if the constant-speed end pre-decision flag is high (High at S55), makes the charge-discharge mode transition from the charge mode to the charge-discharge off mode to set on the basis that the timing at which to end charging has been reached (S56).

Referring back to FIG. 9, the servo control unit 52 performs a constant-speed end decision process (S35) and, if determining that the timing at which to switch from the constant speed period to the deceleration period has been reached, ends the process. By this means, speed control (S30) finishes.

Referring back to FIG. 8, after the speed control (S30) finishes (after the seek time period ends), the servo control unit 52 performs position control (S22).

Figure 12:
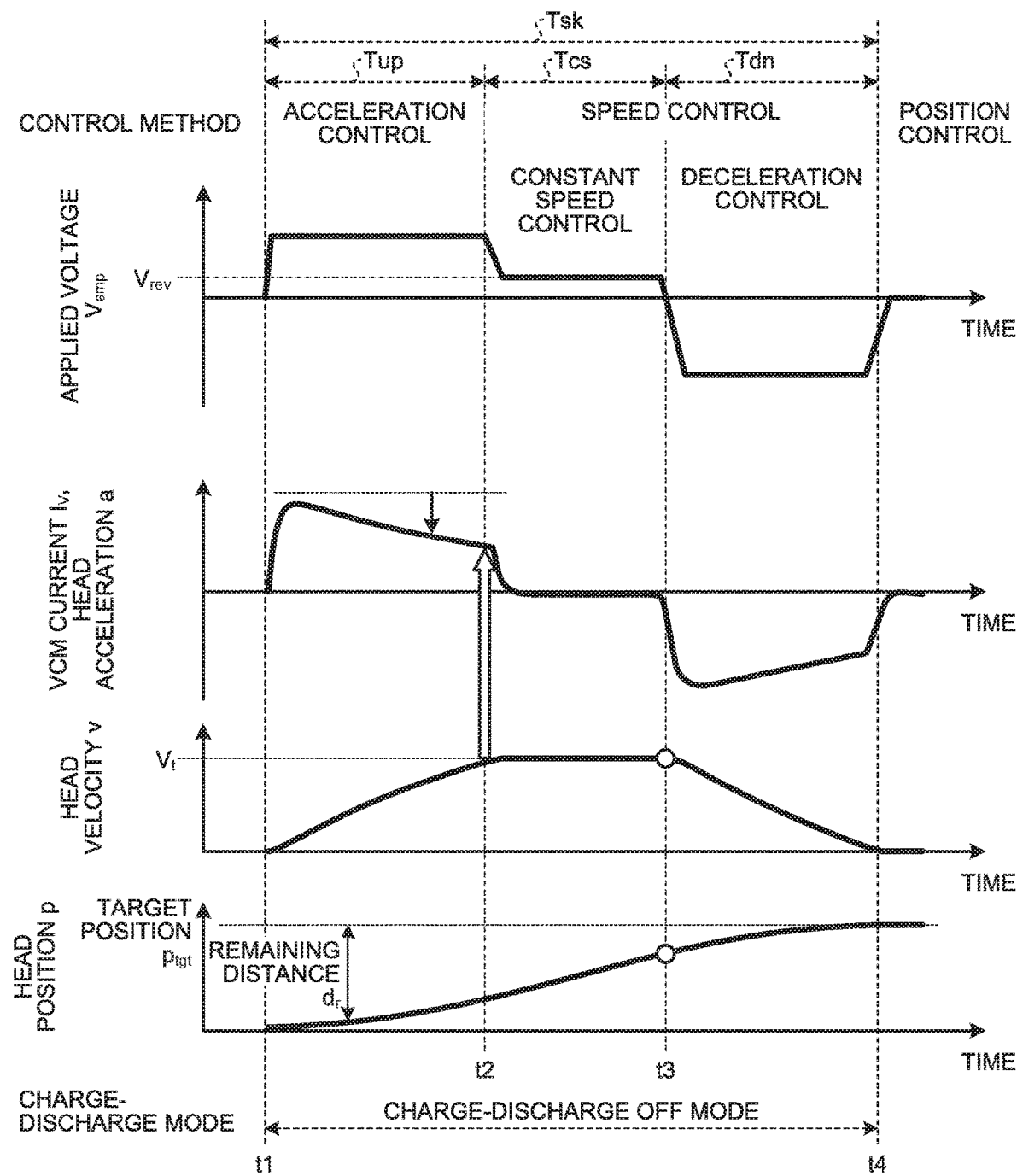
FIG. 12 is a waveform chart illustrating a seek execution process in a charge-discharge off seek mode in the embodiment.

For example, if the charge-discharge seek mode is set to be the charge-discharge off seek mode (normal seek mode), the servo control unit 52 performs control as shown in FIG. 12. FIG. 12 is a waveform chart illustrating a seek execution process in the charge-discharge off seek mode.

When the seek time period Tsk starts, the servo control unit 52 performs acceleration control, speed control, and position control sequentially. That is, the servo control unit 52 performs acceleration control in the acceleration period Tup, constant-speed control for speed control in the constant speed period Tcs, and deceleration control for speed control in the deceleration period Tdn. After the seek time period Tsk ends, the servo control unit 52 performs position control.

At timing t1, acceleration control starts. In acceleration control, applied voltage $V_{amp}$ across the opposite ends of the VCM 4 is controlled to accelerate the velocity v of the head MH by the VCM 4. If there is a restriction on the head velocity upper limit $v_t$, when the velocity v of the head MH reaches the head velocity upper limit $v_t$ (e.g., timing t2), the servo control unit 52 switches to constant-speed control (i.e., switches from the acceleration period Tup to the constant speed period Tcs). At this time, because the back electromotive voltage is developed, applied voltage $V_{amp}=V_{rev}$ to cancel out the back electromotive voltage is applied in order to maintain speed. In order to reach the target track to stop, the servo control unit 52 checks a table of velocity against the remaining distance $d_r$ for each sample and, if conditions are satisfied (e.g., timing t3), switches from constant-speed control to deceleration control (i.e., switches from the constant speed period Tcs to the deceleration period Tdn). When seek operation finishes at timing t4, the servo control unit 52 performs the position control of the head MH using the servo signal read from servo areas of the disk 2.

Figure 13:
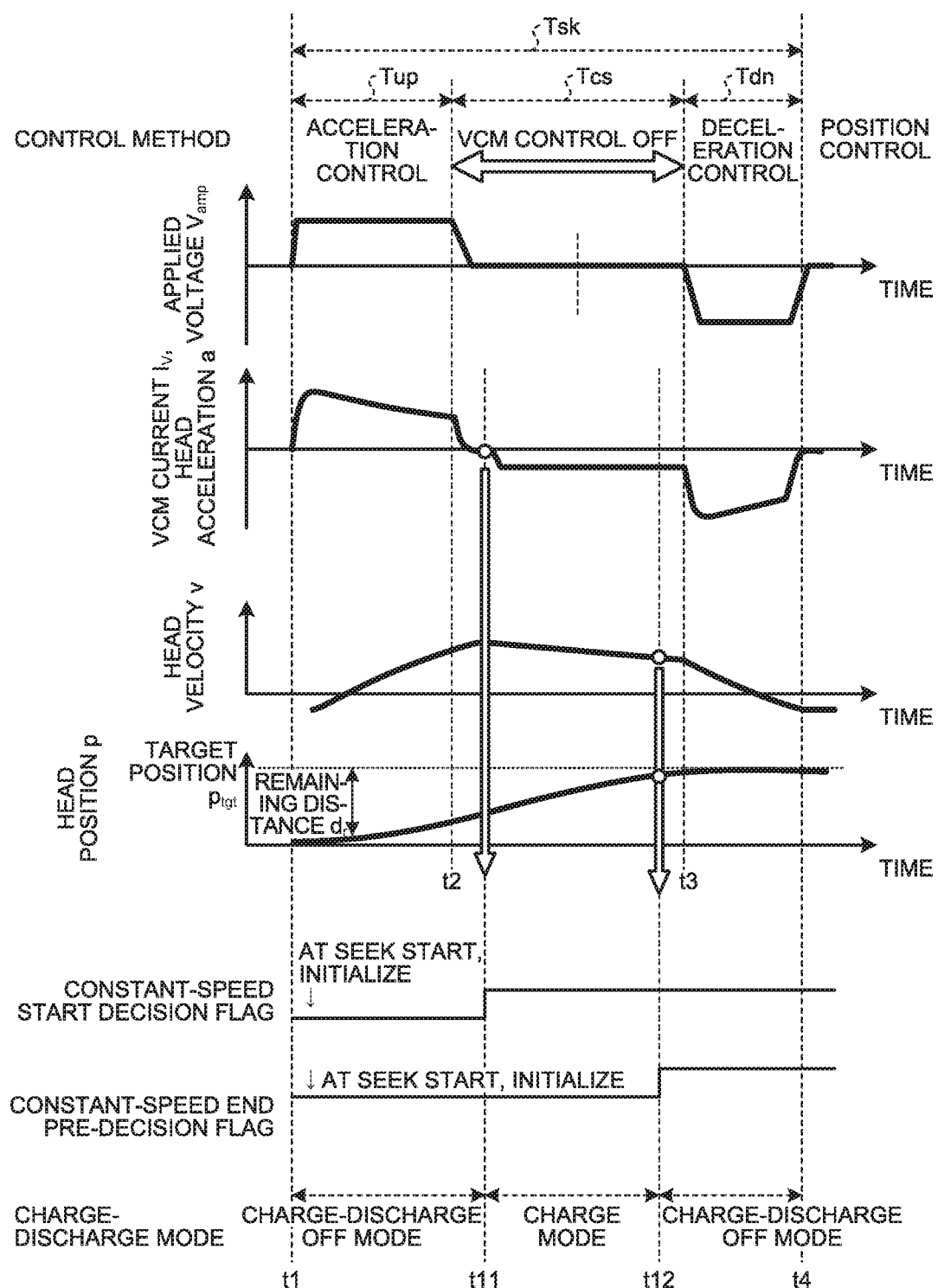
FIG. 13 is a waveform chart illustrating a seek execution process in a charge seek mode in the embodiment.

Or, for example, if the charge-discharge seek mode is set to be the charge seek mode, the servo control unit 52 performs control as shown in FIG. 13. FIG. 13 is a waveform chart illustrating a seek execution process in the charge seek mode.

The servo control unit 52 initializes the constant-speed start decision flag and the constant-speed end pre-decision flag (set the flags to be low) at a seek start. If the charge-discharge seek mode is set to be the charge seek mode, when the head velocity becomes constant, that is, when the head acceleration comes close to zero, the servo control unit 52 switches the charge-discharge mode from the charge-discharge off mode to the charge mode. At switching during the constant speed period Tcs in the seek time period Tsk, variation in acceleration is small, so that the influence on VCM vibration excitation is small. After switching from acceleration control to speed control for constant speed, switching the charge-discharge mode is performed.

For example, using the estimated acceleration $a_{esti}$ of the state observer and an acceleration threshold $th_{acc}$, if $|a_{esti}|<th_{acc}$ is satisfied, it is determined that the speed is constant, and the constant-speed start decision flag is changed from low to high. When determining that the speed is constant (at timing t11 when the constant-speed start decision flag becomes high), the servo control unit 52 changes a charge mode switch flag from low to high and makes the charge-discharge mode transition from the charge-discharge off mode to the charge mode to set. After this, the servo control unit 52 maintains the constant-speed start decision flag high. When put in the charge mode, electricity from power supply does not pass through the VCM 4, and because a back electromotive voltage is mainly developed across the VCM 4, the head velocity v gradually decreases. Hence, in the charge seek mode, the seek time is longer than in the charge off seek mode (normal seek).

Figure 14:
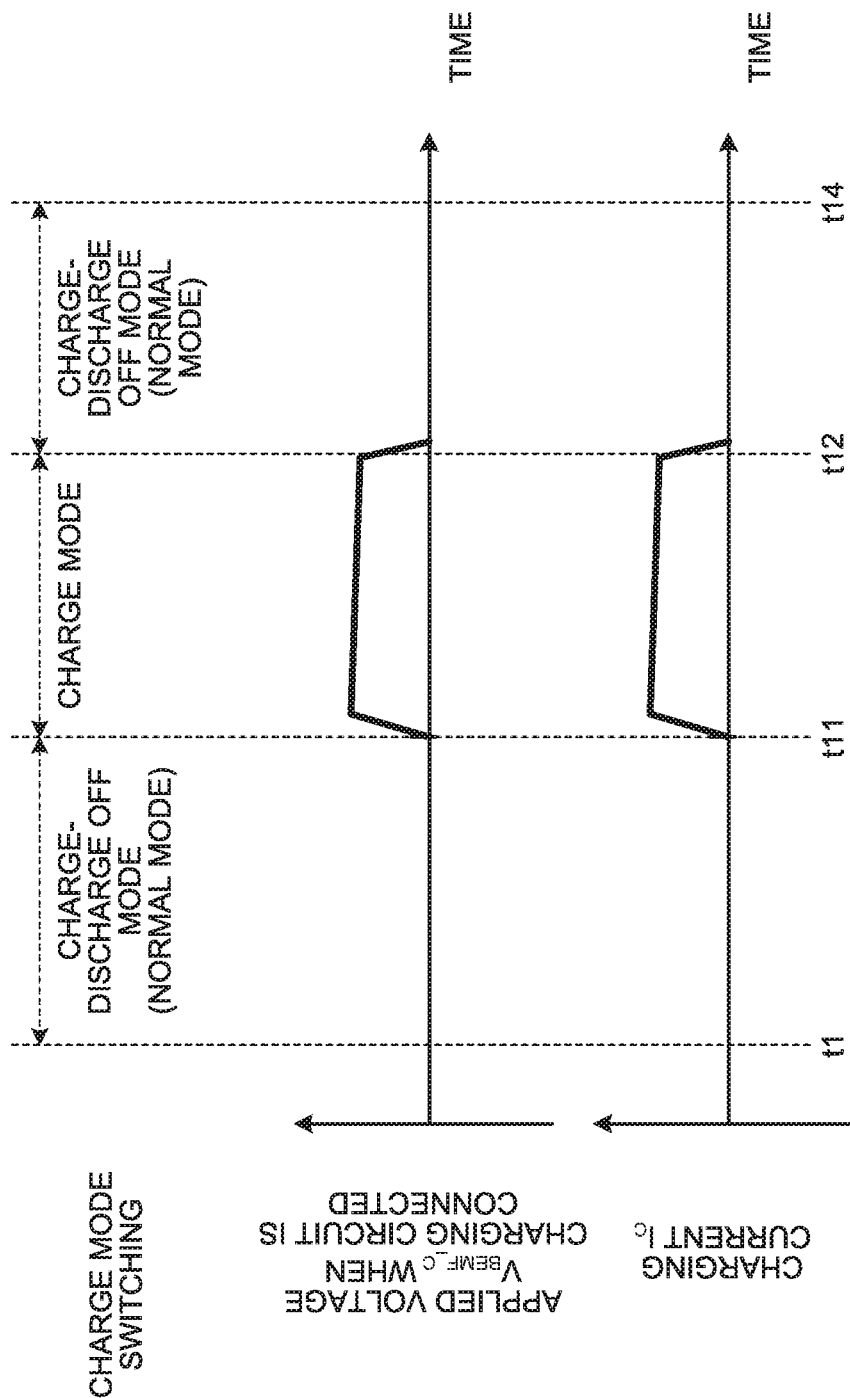
FIG. 14 is a waveform chart illustrating the charging current in a charge mode in the embodiment.

Thus, as shown in FIG. 14, at timing t11, a charging current Ic due to a back electromotive voltage $V_{BEMF\_C}$ of the VCM 4 starts flowing into the electricity storage unit 13 so that charging the electricity storage unit 13 starts. FIG. 14 is a waveform chart illustrating the charging current in the charge mode.

The servo control unit 52 makes a decision for switching from the charge mode to the charge off mode at timing t12 before timing t3 at which to switch to deceleration control as shown in FIG. 13. This decision is made in the constant-speed end pre-decision process. As opposed to a normal mechanism for switching from constant speed control to deceleration control, a mechanism which makes a decision earlier is adopted. For example, when using a table of velocity against the remaining distance $d_r$, the servo control unit 52 multiplies the data series of the remaining distance by a correction coefficient $k_d$ of a value greater than one so as to determine that the constant speed is to end at a timing earlier than switching to deceleration control and to change the constant-speed end pre-decision flag from low to high. When determining that the constant speed is to end (at timing t12 when the constant-speed end pre-decision flag becomes high), the servo control unit 52 changes a charge off mode switch flag from low to high and makes the charge-discharge mode transition from the charge mode to the charge-discharge off mode to set. After this, the servo control unit 52 maintains the constant-speed end pre-decision flag high.

Thus, as shown in FIG. 14, at timing t12, the charging current Ic due to the back electromotive voltage $V_{BEMF\_C}$ of the VCM 4 finishes flowing into the electricity storage unit 13 so that charging the electricity storage unit 13 finishes.

Referring back to FIG. 4, after the seek execution process (S20) finishes, the servo control unit 52 notifies seek completion to the controller control unit 51 (S4). The controller control unit 51 waits until seek completion is notified by the servo control unit 52 (No at S5), and when seek completion is notified by the servo control unit 52 (Yes at S5), finishes the sector access command processing.

As such, in the present embodiment, the disk device 100 is configured such that the current path of the VCM 4 can be electrically connected to the electricity storage unit 13. Thus, the electricity storage unit 13 can be charged with a current according to the back electromotive voltage $V_{bemf}$ of the VCM 4 in the disk device 100. Further, while charging the electricity storage unit 13 with electricity is repeated several times, the amount of power stored in the electricity storage unit 13 is monitored, and, when the amount of power in the electricity storage unit 13 exceeds a threshold, the SPM 3, VCM 4, ICs 11, 12, and the like can be driven using power in the electricity storage unit 13. By this means, electrical energy according to the back electromotive voltage $V_{bemf}$ of the VCM 4 can be effectively utilized, so that the total power consumption in the disk device 100 can be reduced.

Note that although, being put in the charge seek mode, the seek time is longer than in the charge-discharge off seek mode (normal seek) as shown in FIGS. 13 and 14, the disk device 100 has a function of determining whether a charge seek is to be performed according to the rotation wait time in random access, so that the random access performance is not impaired.

Figure 15:
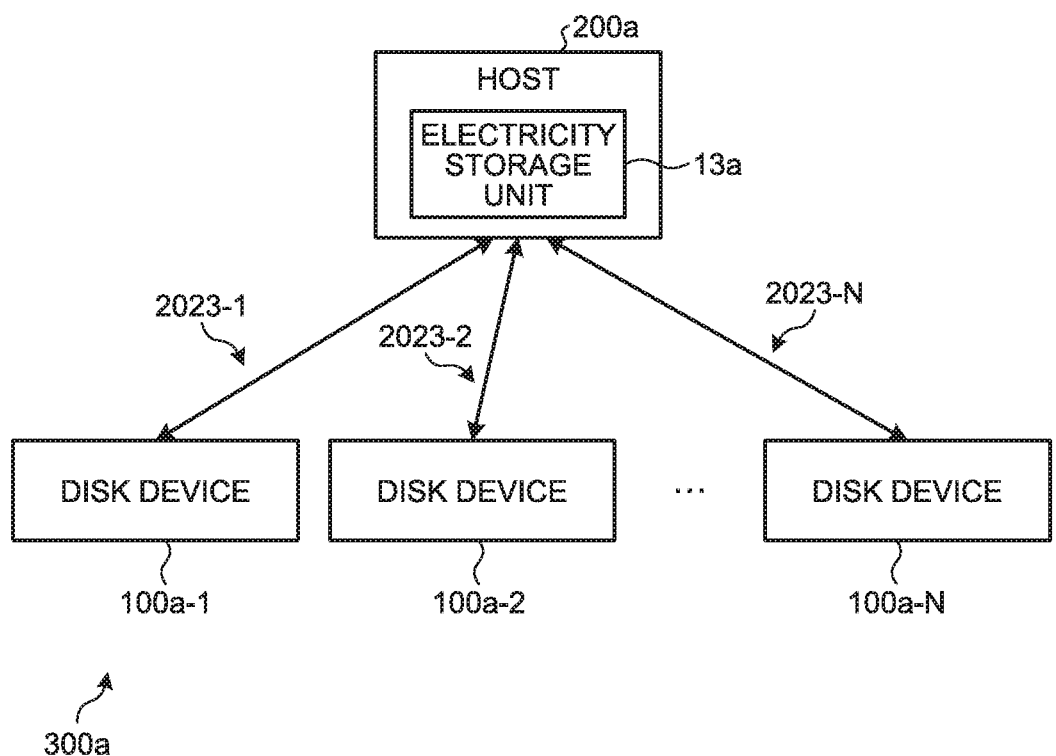
FIG. 15 is a diagram illustrating schematically the configuration of an information processing apparatus including disk devices according to a modified example of the embodiment.

Instead of the electricity storage unit 13 being provided in the disk device 100 (see FIG. 1), an electricity storage unit 13a may be provided in a host 200a as shown in FIG. 15. FIG. 15 is a diagram illustrating schematically the configuration of an information processing apparatus 300a including disk devices 100a-1 to 100a-N. That is, the information processing apparatus 300a includes the host 200a and the multiple disk devices 100a-1 to 100a-N, where N is an integer of two or greater. The host 200a has the electricity storage unit 13a configured to be shared by the multiple disk devices 100a-1 to 100a-N via power lines 2023-1 to 2023-N.

Figure 16:
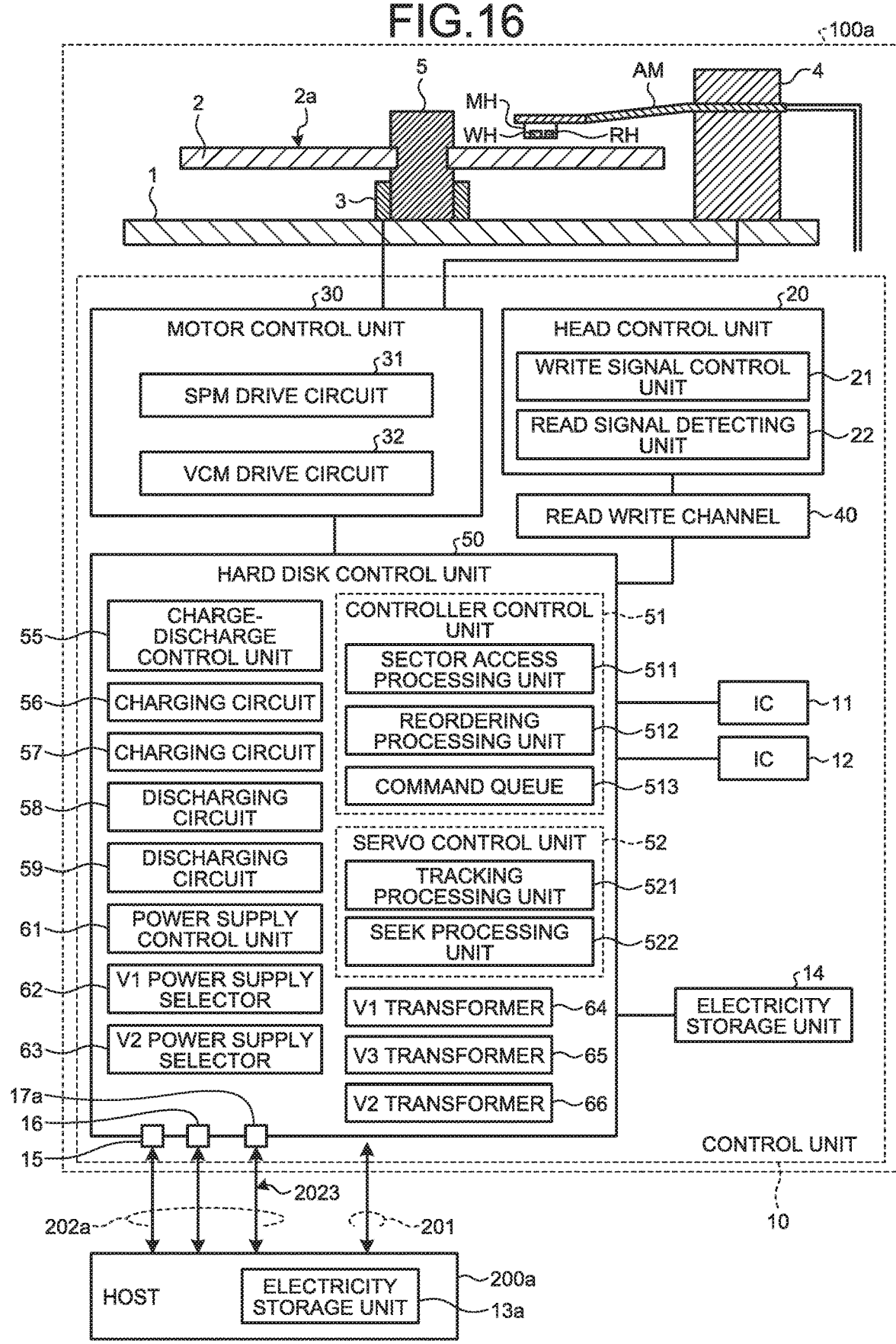
FIG. 16 is a diagram illustrating schematically the configuration of the disk device according to the modified example of the embodiment.

In this case, each disk device 100a further has an electricity storage terminal 17a via which to charge the electricity storage unit 13a as shown in FIG. 16. FIG. 16 is a diagram illustrating schematically the configuration of the disk device 100a. The electricity storage terminal 17a is electrically connected to the electricity storage unit 13a of the host 200a via the power line 2023 of a power line group 202a.

Figure 17:
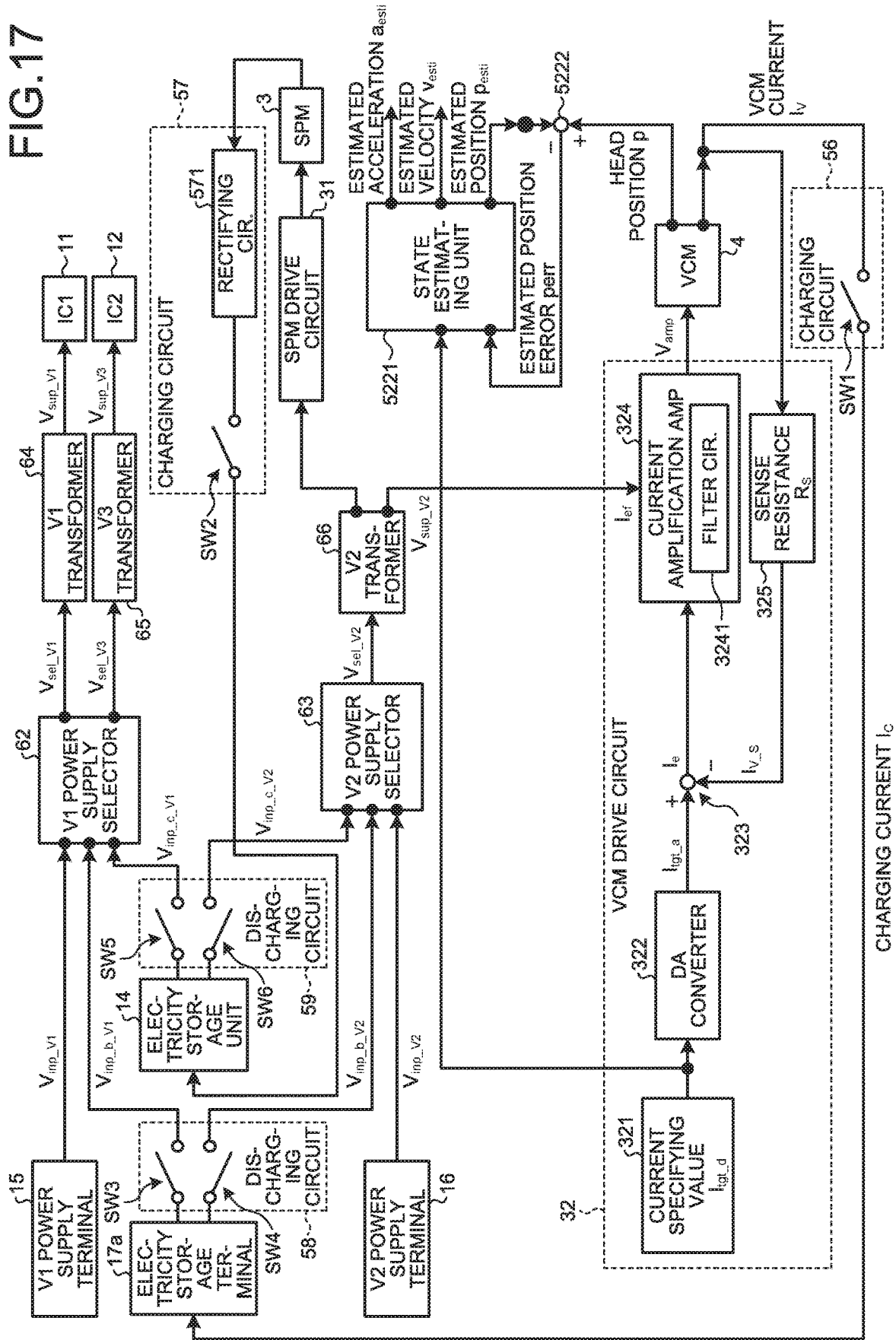
FIG. 17 is a diagram illustrating the configuration of circuitry related to a VCM and SPM in the modified example of the embodiment.

A charging circuit 56 of each disk device 100a can switch between a first state and a second state as shown in FIG. 17. FIG. 17 is a diagram illustrating the configuration of circuitry related to the VCM 4 and SPM 3. The first state is a state where the current path of the VCM 4 is electrically cut off from the electricity storage unit 13a via the electricity storage terminal 17a and the power line 2023. The second state is a state where the current path of the VCM 4 is electrically connected to the electricity storage unit 13a via the electricity storage terminal 17a and the power line 2023. The charging circuit 56 has a switch SW1, one end of the switch SW1 being electrically connected to the current path of the VCM 4, the other end of the switch SW1 being electrically connected to the electricity storage terminal 17a. According to a control signal received from the charge-discharge control unit 55, the charging circuit 56 turns off the switch SW1 to switch to the first state and turns on the switch SW1 to switch to the second state.

For example, the charging circuit 56 switches from the first state to the second state during a seek time period when the head MH is made to seek. That is, the seek time period contains an acceleration period, a constant speed period, and a deceleration period. The acceleration period is a period when the speed of the head MH is accelerated and is a period when the absolute value of the acceleration of the head MH exceeds a first threshold. The constant speed period is subsequent to the acceleration period, is a period when the speed of the head MH can be controlled to be almost constant, and is a period when the absolute value of the acceleration of the head MH is smaller than the first threshold. The deceleration period is subsequent to the constant speed period, is a period when the speed of the head MH is decelerated and is a period when the absolute value of the acceleration of the head MH exceeds the first threshold. At a first timing corresponding to switching from the acceleration period to the constant speed period, the charging circuit 56 switches from the first state to the second state. Thus, during the constant speed period, the charging circuit 56 can charge the electricity storage unit 13a with the VCM current $I_v$ from the VCM 4. At a second timing corresponding to switching from the constant speed period to the deceleration period, the charging circuit 56 switches from the second state to the first state. Thus, the charging circuit 56 can finish charging the electricity storage unit 13a with electricity immediately before switching from the constant speed period to the deceleration period.

Thus, as compared with the embodiment, the electricity storage unit 13a need not be included in each individual disk device 100a, so that it is possible to simplify the configuration and to reduce cost. Further, as compared with the embodiment, power according to the back electromotive voltage of the VCM 4 can be collected efficiently.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
   a head;
   a disk having a recording surface;
   a first motor that causes the head to seek along the recording surface;
   a first circuit that can switch between a first state and a second state, the first state being a state where a current path of the first motor is electrically cut off from a first electricity storage unit, the second state being a state where the current path of the first motor is electrically connected to the first electricity storage unit;
   a second motor that rotates the disk; and
   a second circuit that includes a rectifying circuit connected to a current path of the second motor and can switch between a third state and a fourth state, the third state being a state where the rectifying circuit is electrically cut off from a second electricity storage unit, the fourth state being a state where the rectifying circuit is electrically connected to the second electricity storage unit.

2. A disk device comprising:
   a head;
   a disk having a recording surface;
   a first motor that causes the head to seek along the recording surface;
   a first circuit that can switch between a first state and a second state, the first state being a state where a current path of the first motor is electrically cut off from a first electricity storage unit, the second state being a state where the current path of the first motor is electrically connected to the first electricity storage unit;
   a power supply circuit; and
   a third circuit that can switch between a fifth state and a sixth state, the fifth state being a state where the first electricity storage unit is electrically cut off from the power supply circuit, the sixth state being a state where the first electricity storage unit is electrically connected to the power supply circuit.

3. The disk device according to claim 1, further comprising:
- a power supply circuit;
- a third circuit that can switch between a fifth state and a sixth state, the fifth state being a state where the first electricity storage unit is electrically cut off from the power supply circuit, the sixth state being a state where the first electricity storage unit is electrically connected to the power supply circuit; and
- a fourth circuit that can switch between a seventh state and an eighth state, the seventh state being a state where the second electricity storage unit is electrically cut off from the power supply circuit, the eighth state being a state where the second electricity storage unit is electrically connected to the power supply circuit.

4. A disk device comprising:
- a head;
- a disk having a recording surface;
- a first motor that causes the head to seek along the recording surface; and
- a first circuit that can switch between a first state and a second state, the first state being a state where a current path of the first motor is electrically cut off from a first electricity storage unit, the second state being a state where the current path of the first motor is electrically connected to the first electricity storage unit,
- wherein the first circuit switches from the first state to the second state during a seek time period when the head is made to seek,
- wherein the seek time period includes:
  - a first period when absolute value of acceleration of the head exceeds a first threshold; and
  - a second period subsequent to the first period and when absolute value of acceleration of the head is smaller than the first threshold, and
- wherein the first circuit switches from the first state to the second state at a first timing corresponding to switching from the first period to the second period.

5. The disk device according to claim 4, wherein the seek time period further includes:
- a third period subsequent to the second period and when the absolute value of acceleration of the head exceeds the first threshold, and
- wherein the first circuit switches from the second state to the first state at a second timing corresponding to switching from the second period to the third period.

6. The disk device according to claim 2, wherein when power stored in the first electricity storage unit comes greater than or equal to a second threshold, the third circuit switches from the fifth state to the sixth state.

7. A disk device comprising
- a head;
- a disk having a recording surface;
- a first motor that causes the head to seek along the recording surface;
- a first circuit that can switch between a first state and a second state, the first state being a state where a current path of the first motor is electrically cut off from a first electricity storage unit, the second state being a state where the current path of the first motor is electrically connected to the first electricity storage unit; and
- an electricity storage terminal that can be connected to the first electricity storage unit via a power line,
- wherein the first state is a state where a current path of the first motor is electrically cut off from the first electricity storage unit via the electricity storage terminal and the power line, and
- wherein the second state is a state where the current path of the first motor is electrically connected to the first electricity storage unit via the electricity storage terminal and the power line.

* * * * *